US009030980B2

(12) United States Patent
Kim et al.

(10) Patent No.: US 9,030,980 B2
(45) Date of Patent: May 12, 2015

(54) METHOD AND APPARATUS FOR TRANSMITTING AND RECEIVING UPLINK DATA IN MOBILE COMMUNICATION SYSTEM

(75) Inventors: Soeng-Hun Kim, Suwon-si (KR); Joon-Young Cho, Suwon-si (KR); Gert-Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 13/166,074

(22) Filed: Jun. 22, 2011

(65) Prior Publication Data
US 2011/0310781 A1    Dec. 22, 2011

(30) Foreign Application Priority Data

| Jun. 22, 2010 | (KR) | 10-2010-0059025 |
| Jun. 29, 2010 | (KR) | 10-2010-0061634 |
| Oct. 6, 2010 | (KR) | 10-2010-0097542 |
| Dec. 23, 2010 | (KR) | 10-2010-0133202 |

(51) Int. Cl.
G08C 17/00 (2006.01)
H04L 5/00 (2006.01)
H04W 52/02 (2009.01)

(52) U.S. Cl.
CPC .......... *H04L 5/0007* (2013.01); *H04L 5/0046* (2013.01); *H04W 52/0216* (2013.01); *Y02B 60/50* (2013.01)

(58) Field of Classification Search
CPC  H04W 52/0216; H04L 5/0007; H04L 5/0046
USPC .................. 455/522–525, 517; 370/311, 318, 370/328–329
See application file for complete search history.

(56) References Cited

U.S. PATENT DOCUMENTS

| 8,224,372 | B2 * | 7/2012 | Pedersen et al. | 455/522 |
| 8,514,794 | B2 * | 8/2013 | Zhang et al. | 370/329 |

(Continued)

FOREIGN PATENT DOCUMENTS

| JP | 2009-100452 A | 5/2009 |
| KR | 10-2007-0047636 A | 5/2007 |

(Continued)

OTHER PUBLICATIONS

"Uplink Power Control for LTE-Advanced", 3GPP TSG RAN WG1 #59bis Meeting R1-100322, Jan. 12, 2010.

(Continued)

*Primary Examiner* — Nicholas Jensen
*Assistant Examiner* — Berhanu Belete
(74) *Attorney, Agent, or Firm* — Jefferson IP Law, LLP

(57) ABSTRACT

A method for transmitting uplink data using multiple carriers by a User Equipment (UE) in a mobile communication system is provided. The method includes determining a first maximum transmission power indicating a maximum transmission power for each carrier and a second maximum transmission power indicating a maximum transmission power for all carriers based on information for setting transmission power, received from an evolved Node B (eNB), determining a minimum value from among a required transmission power and the first maximum transmission power as an uplink transmission power, for each carrier, scaling the determined uplink transmission powers so that a sum of the uplink transmission powers is less than or equal to the second maximum transmission power, and transmitting the uplink data based on the scaled uplink transmission powers.

40 Claims, 12 Drawing Sheets

(56) References Cited

U.S. PATENT DOCUMENTS

| | | |
|---|---|---|
| 8,768,397 B2 * | 7/2014 | Imamura et al. ............... 455/522 |
| 2006/0252447 A1 | 11/2006 | Muharemovic et al. |
| 2006/0286994 A1 * | 12/2006 | Kwak et al. ................... 455/522 |
| 2007/0099648 A1 | 5/2007 | Kim et al. |
| 2007/0178930 A1 * | 8/2007 | Xiao et al. .................... 455/522 |
| 2008/0207250 A1 | 8/2008 | Park et al. |
| 2010/0157895 A1 * | 6/2010 | Pani et al. .................... 370/328 |
| 2010/0197339 A1 * | 8/2010 | Pedersen et al. ............... 455/522 |
| 2010/0246561 A1 * | 9/2010 | Shin et al. .................... 370/345 |
| 2011/0019625 A1 * | 1/2011 | Zhang et al. .................. 370/329 |
| 2012/0252524 A1 * | 10/2012 | Gora et al. .................... 455/522 |

FOREIGN PATENT DOCUMENTS

| | | |
|---|---|---|
| KR | 10-2008-0078305 A | 8/2008 |
| WO | 2010/065759 A2 | 6/2010 |
| WO | 2010/083324 A2 | 7/2010 |
| WO | 2010/089284 A2 | 8/2010 |

OTHER PUBLICATIONS

"LS on uplink power control in LTE-A", 3GPP TSG RAN WG1 Meeting #59bis R1-100831, Feb. 5, 20110.

* cited by examiner

METHOD AND APPARATUS FOR TRANSMITTING AND RECEIVING UPLINK DATA IN MOBILE COMMUNICATION SYSTEM

PRIORITY

This application claims the benefit under 35 U.S.C. §119(a) of a Korean patent application filed in the Korean Intellectual Property Office on Jun. 22, 2010 and assigned Serial No. 10-2010-0059025, and a Korean patent application filed in the Korean Intellectual Property Office on Jun. 29, 2010 and assigned Serial No. 10-2010-0061634, a Korean patent application filed in the Korean Intellectual Property Office on Oct. 6, 2010 and assigned Serial No. 10-2010-0097542, and a Korean patent application filed in the Korean Intellectual Property Office on Dec. 23, 2010 and assigned Serial No. 10-2010-0133202, the entire disclosure of each of which is hereby incorporated by reference.

BACKGROUND OF THE INVENTION

1. Field of the Invention

The present invention relates to a method and apparatus for transmitting and receiving UpLink (UL) data in a mobile communication system. More particularly, the present invention relates to a method and apparatus for transmitting and receiving UL data using multiple carriers in a mobile communication system.

2. Description of the Related Art

Mobile communication systems have been developed to provide communications, with the user mobility secured. Due to the rapid development of mobile communications technology, these mobile communication systems can now provide not only voice communication services but also high-speed data communication services.

Recently, standardization for a Long Term Evolution (LTE) system, one of the next-generation mobile communication systems, is underway in the 3rd Generation Partnership Project (3GPP). The LTE system is technology for realizing high-speed packet-based communications having a transfer rate of up to 100 Mbps, which is higher than the currently available data rate, and its standardization is almost complete. In line with the completion of the LTE standardization, an LTE-Advanced (LTE-A) system is now under discussion, which improves a transfer rate by combining the LTE communication system with several new technologies. The term 'LTE system' as used herein may be construed to include the legacy LTE system and the LTE-A system.

One of the newly introduced technologies is Carrier Aggregation (CA). CA is technology in which a User Equipment (UE) transmits and receives data using multiple carriers. The UE transmits and receives data through specific cells (generally, cells belonging to the same evolved Node B (eNB)) of aggregated carriers, and this is equivalent to transmitting and receiving data through a plurality of cells by a UE.

In the mobile communication system of the related art, in single-carrier UL transmission, a UE calculates required transmission (Tx) power taking into account the amount of scheduled resources, a coding rate, a channel status, etc. and determines the final UL Tx power by limiting (or defining) the calculated required Tx power as a specific maximum Tx power.

However, a method and apparatus for determining UL Tx power in multi-carrier UL transmission by a UE in a mobile communication system has not been discussed yet. Therefore, there is a need for a method of determining UL Tx power for each carrier so that a UE may minimize interference to other frequency bands or other cells while maintaining its required Tx power if possible.

SUMMARY OF THE INVENTION

Aspects of the present invention are to address at least the above-mentioned problems and/or disadvantages and to provide at least the advantages described below. Accordingly, an aspect of the present invention is to provide a method and apparatus, in which in a mobile communication system, a User Equipment (UE) determines UpLink (UL) transmission (Tx) power in multi-carrier UL transmission and transmits data with the determined UL Tx power, and an eNB receives data from the UE.

Another aspect of the present invention is to provide a method and apparatus, in which in a mobile communication system, a UE determines UL Tx power for each carrier and transmits data with the determined UL Tx power so as to minimize interference while maintaining required Tx power in multi-carrier UL transmission, and an evolved Node B (eNB) receives data from the UE.

In accordance with one aspect of the present invention, a method for transmitting uplink data using multiple carriers by a User Equipment (UE) in a mobile communication system is provided. The method includes determining a first maximum transmission power indicating a maximum transmission power for each carrier and a second maximum transmission power indicating a maximum transmission power for all carriers based on information for setting transmission power, received from an eNB, determining a minimum value from among a required transmission power and the first maximum transmission power as an uplink transmission power, for each carrier, scaling the determined uplink transmission powers so that a sum of the uplink transmission powers is less than or equal to the second maximum transmission power, and transmitting the uplink data based on the scaled uplink transmission powers.

In accordance with another aspect of the present invention, an apparatus for transmitting uplink data using multiple carriers by a UE in a mobile communication system is provided. The apparatus includes a receiver for receiving information for setting transmission power from an eNB, a controller for determining a first maximum transmission power indicating a maximum transmission power for each carrier and a second maximum transmission power indicating a maximum transmission power for all carriers based on the information for setting transmission power, for determining a minimum value from among a required transmission power and the first maximum transmission power as an uplink transmission power, for each carrier, and for scaling the determined uplink transmission powers so that a sum of the uplink transmission powers is less than or equal to the second maximum transmission power, and a transmitter for transmitting the uplink data based on the scaled uplink transmission powers.

In accordance with another aspect of the present invention, a method for receiving uplink data transmitted using multiple carriers from a UE by an eNB in a mobile communication system is provided. The method includes transmitting information for setting transmission power for the uplink data to the UE, and receiving, from the UE, uplink data that is transmitted with uplink transmission powers scaled based on the information for setting transmission power. For the scaled uplink transmission powers, a first maximum transmission power indicating a maximum transmission power for each carrier and a second maximum transmission power indicating a maximum transmission power for all carriers are determined based on the information for setting transmission power, a minimum value from among a required transmission power and the first maximum transmission power is as an uplink transmission power, for each carrier, and the determined uplink transmission powers are scaled so that a sum of the uplink transmission powers is less than or equal to the second maximum transmission power.

In accordance with another aspect of the present invention, an apparatus for receiving uplink data transmitted using multiple carriers from a UE by an eNB in a mobile communication system is provided. The apparatus includes a transmitter for transmitting information for setting transmission power for the uplink data to the UE, and a receiver for receiving, from the UE, uplink data that is transmitted with uplink transmission powers scaled based on the information for setting transmission power. For the scaled uplink transmission powers, a first maximum transmission power indicating a maximum transmission power for each carrier and a second maximum transmission power indicating a maximum transmission power for all carriers are determined based on the information for setting transmission power, a minimum value from among a required transmission power and the first maximum transmission power is as an uplink transmission power, for each carrier, and the determined uplink transmission powers are scaled so that a sum of the uplink transmission powers is less than or equal to the second maximum transmission power.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numerals are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention are directed to a method and apparatus for determining UpLink (UL) transmission (Tx) power for each UL carrier when a UE, in which multiple carriers are aggregated, performs multi-carrier UL transmission.

Figure 1:
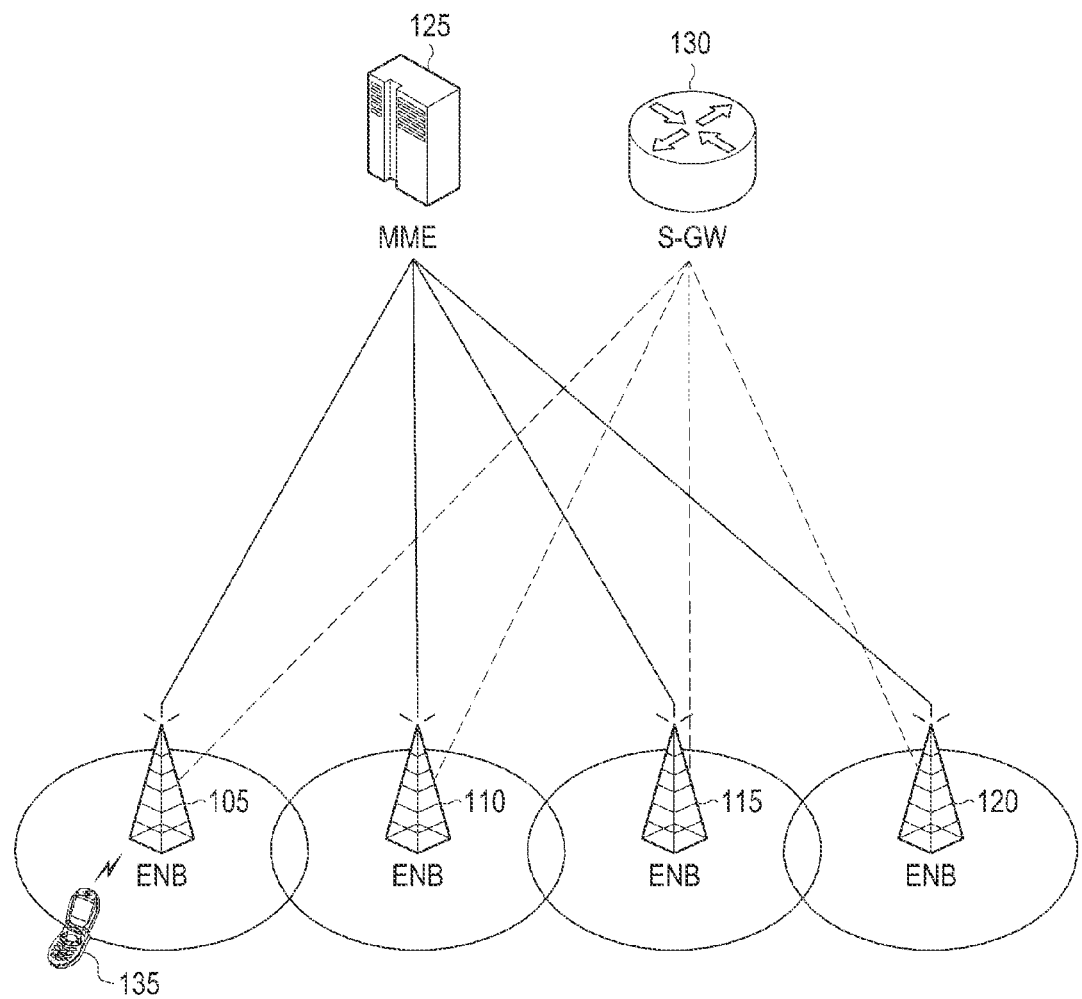
FIG. 1 is a diagram illustrating a structure of a Long Term Evolution (LTE) system, according to an exemplary embodiment of the present invention.

FIG. 1 illustrates a structure of a Long Term Evolution (LTE) system, according to an exemplary embodiment of the present invention.

Referring to FIG. 1, a radio access network of the LTE system includes evolved Node Bs (eNBs) (or Node Bs or base stations) 105, 110, 115 and 120, a Mobility Management Entity (MME) 125, and a Serving-GateWay (S-GW) 130. A UE (or terminal) 135 accesses the external network through the eNBs 105~120 and the S-GW 130.

The eNBs 105~120 correspond to the legacy Node Bs in the Universal Mobile Telecommunications System (UMTS) system. Each of the eNBs is connected to the UE 135 by a wireless channel, and performs a more complex function than the legacy Node B. In the LTE system, since all user traffic including real-time services, such as Voice over Internet Protocol (IP) (VoIP), are serviced through a shared channel, there is a need for a device that performs scheduling by collecting status information such as buffer status, available Tx power status, and channel status of UEs. The eNBs 105~120 may serve as this device. One eNB normally controls a plurality of cells. To realize the transfer rate of, for example, 100 Mbps, the LTE system uses Orthogonal Frequency Division Multiplexing (OFDM) as wireless access technology in, for example, a bandwidth of 20 MHz. In addition, the LTE system employs Adaptive Modulation & Coding (AMC) that adaptively determines a modulation scheme and a channel coding rate according to the channel status of UEs. The S-GW 130, a device for providing data bearers, generates and/or remotes data bearers under control of the MME 125. The MME 125, a device responsible for mobility management functions for MSs and various control functions, is connected to a plurality of eNBs.

Figure 2:
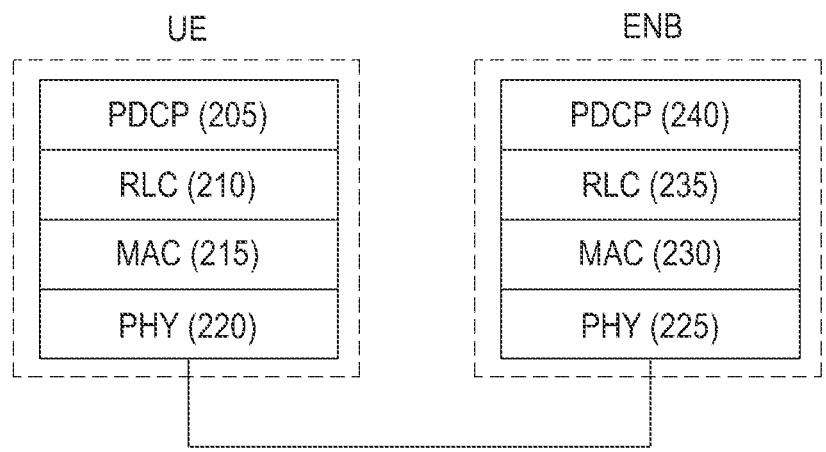
FIG. 2 is a diagram illustrating a structure of a radio protocol in an LTE system, according to an exemplary embodiment of the present invention.

FIG. 2 illustrates a structure of a radio protocol in an LTE system, according to an exemplary embodiment of the present invention.

Referring to FIG. 2, as to a radio protocol of the LTE system, a UE and an eNB include Packet Data Convergence Protocols (PDCPs) 205 and 240, Radio Link Control (RLCs) 210 and 235, and Medium Access Control (MACs) 215 and 230, respectively. The PDCPs 205 and 240 are responsible for operations such as IP header compression/decompression, and the RLCs 210 and 235 reconfigure PDCP Packet Data Units (PDUs) in an appropriate size to perform an Automatic Repeat reQuest (ARQ) operation or the like. The MACs 215 and 230 are connected to several RLC layer devices constructed in a UE, and perform an operation of multiplexing RLC PDUs to a MAC PDU, and demultiplexing RLC PDUs from a MAC PDU. PHYsical (PHY) layers 220 and 225 channel-code and modulate upper-layer data into OFDM symbols and transmit the OFDM symbols over a wireless channel, and demodulate and channel-decode OFDM symbols received over a wireless channel and transferring the decoded OFDM symbols to their upper layers.

Figure 3:
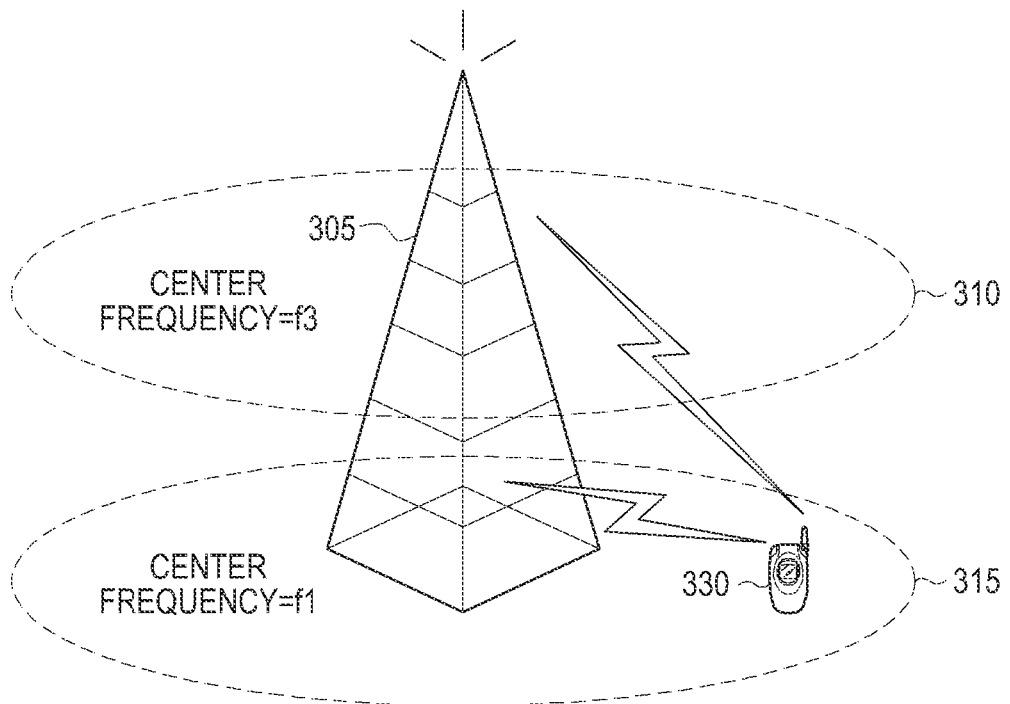
FIG. 3 is a diagram for a description of Carrier Aggregation (CA) in a User Equipment (UE) according to an exemplary embodiment of the present invention.

FIG. 3 is a diagram of Carrier Aggregation (CA) in a UE according to an exemplary embodiment of the present invention.

Referring to FIG. 3, in one eNB, multiple carriers are generally transmitted and received over several frequency bands. For example, when a carrier 315 with a center frequency f1 and a carrier 310 with a center frequency f3 are transmitted in an eNB 305, a UE according to the related art transmits and receives data using one of the two carriers. However, a UE with a CA capability may transmit and receive data to/from several carriers simultaneously. The eNB allocates more carriers to the UE 330 having a CA capability depending on the situation, thereby increasing a transfer rate of the UE 330.

Assuming that in a traditional sense, one DownLink (DL) carrier and one UL carrier transmitted and received in one eNB constitute one cell, the term 'CA' as used herein may be construed to include transmitting and receiving data through several cells simultaneously by a UE. In CA, the maximum transfer rate increases with the number of aggregated carriers.

In the following description of exemplary embodiments of the present invention, UE's receiving data through an arbitrary DL carrier and transmitting data through an arbitrary UL carrier is equivalent to transmitting and receiving data using control channels and data channels provided by cells corresponding to center frequencies featuring the above carriers and their frequency bands. Although exemplary embodiments of the present invention will be described below in connection with the LTE system for convenience of description, exemplary embodiments of the present invention may be applied to any wireless communication systems supporting CA.

An exemplary embodiment of the present invention provides a method and apparatus, in which a UE determines UL Tx power for each carrier in performing UL transmission using multiple UL carriers.

In a mobile communication system, in performing single-carrier UL transmission, a UE calculates required Tx power, and determines UL Tx power by limiting (or defining) the required Tx power as a specific maximum Tx power. The maximum Tx power is a value determined taking into account the intrinsic maximum Tx power of a UE, determined by a power class of the UE, the maximum Tx power allowed in a cell, and the UE's transmission power reduction or transmission power backoff for setting spurious emission to be caused by UE's UL transmission below specific requirements. The required Tx power is Tx power that is calculated by given transmission resources, a Modulation and Coding Scheme (MCS) level, a path loss, etc., and should be applied for given UL transmission. For example, upon receiving UL scheduling from an eNB at an arbitrary time, a UE calculates required Tx power based on the given transmission resources, the MCS level, the pass loss, etc. Examples of methods for determining UL Tx power in single-carrier transmission by a UE will be described below with reference to FIGS. 4A and 4B.

Figure 4A:
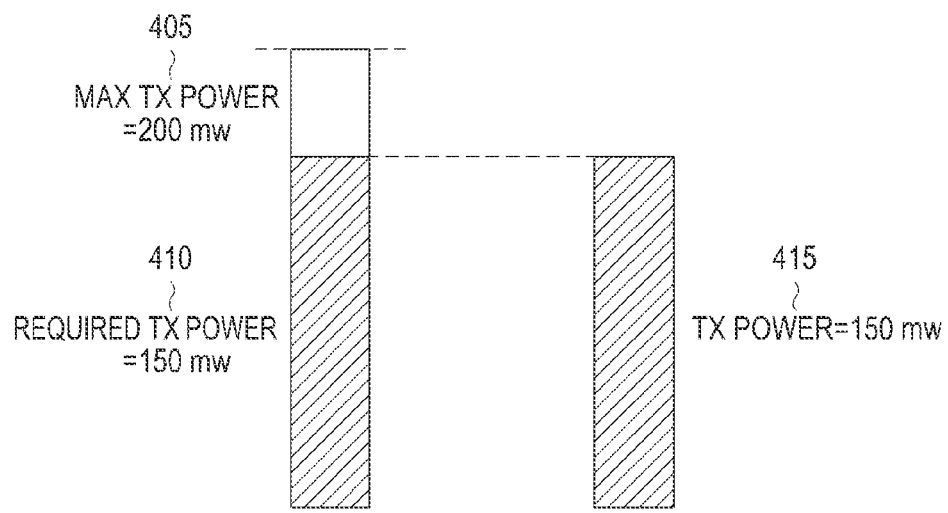
FIGS. 4A and 4B are diagrams illustrating examples of methods for determining UpLink (UL) transmission (Tx) power in single-carrier transmission by a UE according to an exemplary embodiment of the present invention.
Figure 4B:
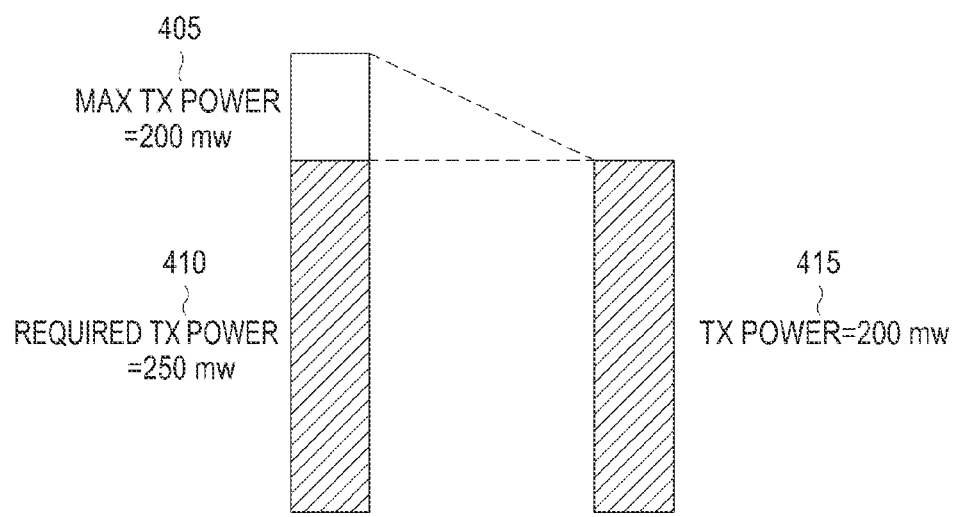

FIGS. 4A and 4B illustrate examples of methods for determining UL Tx power in single-carrier transmission by a UE according to an exemplary embodiment of the present invention.

If required Tx power 410 does not exceed the maximum Tx power 405 as in FIG. 4A, i.e., if the maximum Tx power 405 is 200 mW and the required Tx power 410 is 150 mW, then the UE determines the required Tx power 410 as UL Tx power 415.

On the other hand, if the required Tx power 410 exceeds the maximum Tx power 405 as in FIG. 4B, i.e., if the maximum Tx power 405 is 200 mW and the required Tx power 410 is 250 mW, then the UE determines the maximum Tx power 405 as UL Tx power 415.

However, in multi-carrier UL transmission, a UE may not determine UL Tx power using the above-described method for determining UL Tx power in single-carrier transmission, and may need a method for determining UL Tx power for each carrier.

First Exemplary Embodiment

A first exemplary embodiment of the present invention provides a method for having a sum of Tx power for each UL carrier not exceed a specific maximum value without having UL Tx power for each UL carrier not exceed a specific maximum value for each UL Tx power in multi-carrier UL transmission while maintaining a common feature with the single-carrier UL transmission if possible.

In the first exemplary embodiment of the present invention, if a UE should perform multi-carrier UL transmission, i.e., if the UE receives a plurality of UL scheduling commands for a plurality of cells to perform UL transmission through one or more cells (hereinafter, the phrase 'receiving a UL scheduling command for an arbitrary cell' may indicate that the UE is allocated a UL transmission resource(s) and an MCS level to perform UL transmission in the cell), then the UE calculates required Tx power for each UL carrier according to the related art. The UE limits the required Tx power as a specific allowed maximum Tx power value.

According to an exemplary embodiment of the present invention, the allowed maximum TX power value will be referred to as maximum Tx power 1. The UE compares a sum of the values limited as the maximum Tx power 1 with another allowed maximum Tx power value. This other allowed maximum Tx power value will be referred to as maximum Tx power 2. If the sum of the required Tx powers limited as the maximum Tx power 1 is greater than the maximum Tx power 2, the UE reduces UL Tx powers in a specific manner to have the sum equal the maximum Tx power 2.

To this end, in the first exemplary embodiment of the present invention, the UE primarily determines UL Tx power for each carrier based on the required Tx power and the maximum Tx power 1, and then finally determines UL Tx power for each carrier based on a sum of the primarily determined UL Tx power for each carrier, used as another reference value, or maximum Tx power 2. Accordingly, the first exemplary embodiment of the present invention may prevent power consumption of a UE from becoming excessive when performing UL transmission with the primarily determined UL Tx power for each carrier, and may prevent spurious emission caused by the multi-carrier UL transmission from occurring greater than or equal to a specific required value. The first exemplary embodiment of the present invention will be described in detail below with reference to FIG. 5.

Figure 5:
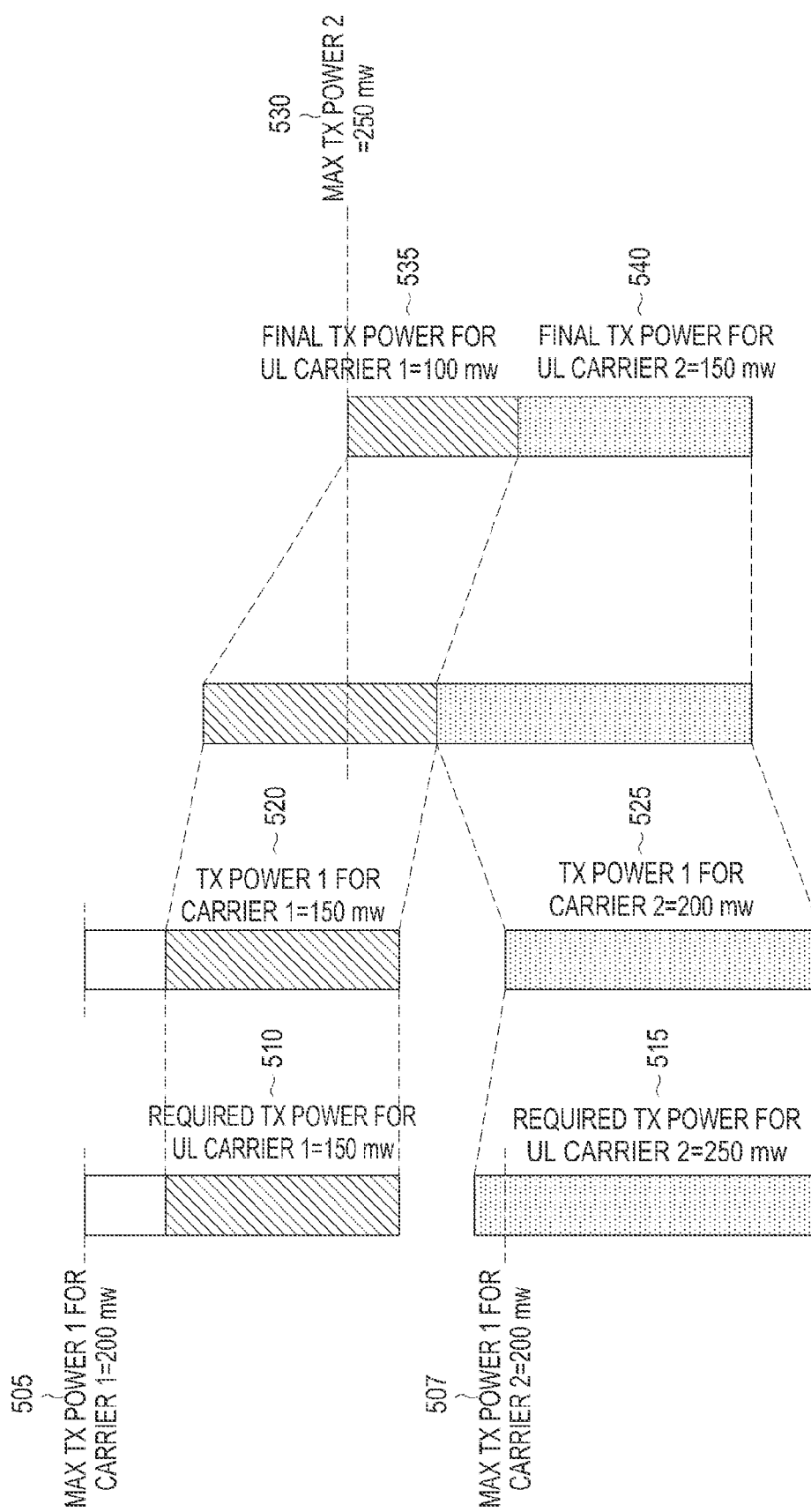
FIG. 5 is a diagram illustrating an example of a method for determining UL Tx power in multi-carrier transmission by a UE according to a first exemplary embodiment of the present invention.

FIG. 5 illustrates an example of a method for determining UL Tx power in multi-carrier transmission by a UE according to a first exemplary embodiment of the present invention.

Referring to FIG. 5, if an arbitrary UE receives UL scheduling commands to perform UL transmission in a carrier 1 and a carrier 2, the UE determines UL Tx power in accordance with the first exemplary embodiment of the present invention. In the current discussion on the standards, carriers and cells are often used in the same meaning. As used herein, carriers and cells will be used in the same meaning unless they need to be distinguished.

The carrier 1 and the carrier 2 have maximum Tx power 1, which is set in a specific manner. It is assumed in FIG. 5 that maximum Tx power 1 505 for the carrier 1 and maximum Tx power 1 507 for the carrier 2 are both 200 mW. As to the maximum Tx power 1 505 and 507, different values may be set for different carriers. How the maximum Tx power 1 505 and 507 are set for each carrier will be described below.

In the example shown in FIG. 5, required Tx power 510 for UL transmission through a UL carrier 1 (hereinafter, UL transmission through a UL carrier x will be referred to as UL transmission x) is set to 150 mW, and required Tx power 515 for UL transmission 2 is set to 250 mW. A method for calculating the required Tx powers 510 and 515 is the same as a method employed in the related art, so a detailed description thereof will be omitted.

In the first exemplary embodiment of the present invention, the UE compares the required Tx powers 510 and 515 with the maximum Tx power 1 505 and 507 for their associated carriers, respectively. If the required Tx powers 510 and 515 are greater than the maximum Tx power 1 505 and 507, the UE sets UL Tx powers 520 and 525 as the maximum Tx power 1 505 and 507. If the required Tx powers 510 and 515 are less than the maximum Tx power 1 505 and 507, the UE determines the UL Tx powers 520 and 525 as the required Tx powers 510 and 515. In the following description, limiting the required Tx power for each carrier as maximum Tx power 1 (i.e., the minimum value between the required Tx power and the maximum Tx power 1) will be referred to as Tx power 1 for an associated carrier. In the example of FIG. 5, for the carrier 1, after comparing the required Tx power 510 of 150 mW with the maximum Tx power 1 505 of 200 mW, the UE determines the UL Tx power 1 520 for the carrier 1 as the required Tx power 510 of 150 mW, since the required Tx power 510 is less than the maximum Tx power 505. For the carrier 2, after comparing the required Tx power 515 of 250 mW with the maximum Tx power 1 507 of 200 mW, the UE determines the UL Tx power 1 525 for the carrier 2 as the maximum Tx power 1 507 of 200 mW, because the required Tx power 515 is greater than the maximum Tx power 507.

The UE determines whether a sum of the UL Tx power 1 520 and 525 for the carriers exceeds maximum Tx power 2 530. The maximum Tx power 2 530 is a value that is uniquely set for each UE, and will be described below. If the sum of the UL Tx power 1 520 and 525 does not exceed the maximum Tx power 2 530, the UE sets final UL Tx powers 535 and 540 for the carriers as the UL Tx power 1 520 and 525 for their associated carriers, respectively. However, if the sum of the UL Tx power 1 520 and 525 exceeds the maximum Tx power 2 530, the UE reduces the final UL Tx powers 535 and 540 in a specific manner to match the sum of the UL Tx power 1 520 and 525 to the maximum Tx power 2 530.

In the example of FIG. 5, if the maximum Tx power 2 530 is 250 mW, the UE is required to reduce the UL Tx power by 100 mW from the sum (350 mW) of the UL Tx power 1 520 and 525. The UE limits the sum of the UL Tx power 1 520 and 525 to 250 mW in a specific manner, for example, in a manner of uniformly reducing the UL Tx power for each carrier. In this example, the final UL Tx power 535 for the carrier 1 is 100 mW, and the final UL Tx power 540 for the carrier 2 is 150 mW.

A method for setting the maximum Tx power 1 and the maximum Tx power 2 by a UE will be described below.

The maximum Tx power 1 is set for each carrier in accordance with Equation (1) below, in which a maximum value of the maximum Tx power 1 is determined by Equation (2) and a minimum value of the maximum Tx power 1 is determined by Equation (3).

$$\text{Min Value of Max } Tx \text{ Power } 1 \leq \text{Max } Tx \text{ Power } 1 \leq \text{Max Value of Max } Tx \text{ Power } 1 \quad (1)$$

$$\text{Max Value of Max } Tx \text{ Power } 1 = \text{MIN [Max } Tx \text{ Power Allowed in Cell of Carrier, Max } Tx \text{ Power Available in Carrier by UE]} \quad (2)$$

$$\text{Min Value of Max } Tx \text{ Power } 1 = \text{MIN [Max } Tx \text{ Power Allowed in Cell of Carrier–Allowed Power Reduction Value for Satisfying Spurious Emission Condition, Max } Tx \text{ Power Available in Carrier by UE–Allowed Power Reduction Value for Satisfying Spurious Emission Condition]} \quad (3)$$

In Equations (2) and (3), the maximum Tx power allowed in a cell of a carrier is the maximum Tx power allowed in a cell where the UE performs UL transmission, and is transferred to the UE as system information or control information.

In Equations (2) and (3), the maximum Tx power available in a carrier by a UE may be the maximum power for a power amplifier that the UE uses in UL transmission for the carrier. A UE performing UL transmission in several carriers has as many power amplifiers as the number of UL carriers it can transmit at the same time. The maximum Tx powers for the power amplifiers may be equal to each other, or different from each other.

If the maximum Tx powers for the power amplifiers are different from each other, the UE fixes a relationship between the carriers and the power amplifiers (i.e., a relationship indicating which power amplifier is used for which carrier) and informs an eNB of the relationship in a specific manner. For example, the UE may notify the eNB of a mapping relationship between a certain carrier and certain power for a power amplifier, using a specific control signal. Alternatively, a UE and an eNB may recognize in advance a relationship between Radio Frequency (RF) units and carriers, and the UE may notify the eNB of the maximum Tx power for each RF unit.

In Equation (3), the allowed power reduction value for satisfying a spurious emission condition is an allowed maximum value of UL Tx power that the UE can reduce to satisfy the spurious emission occurring in adjacent frequency bands due to the UL transmission below a predetermined required reference when the UE has performed a UL transmission. As to the allowed power reduction value, several types have been defined, and the UE selects various allowed power reduction values according to its situations, for example, the amount of allocated transmission resources, a modulation scheme, a frequency band of the allocated transmission resources, etc. Situation-specific allowed power reduction values are defined in the $3^{rd}$ Generation Partnership Project (3GPP) 36.101 standard.

The UE selects the carrier-specific maximum Tx power 1 between the minimum value of the maximum Tx power 1 and the maximum value of the maximum Tx power 1, defined in Equation (1). The UE selects a value satisfying the spurious emission to be caused by UL Tx power below predetermined requirements as the maximum Tx power 1, between the minimum value of the maximum Tx power 1 and the maximum value of the maximum Tx power 1. The maximum Tx power 2 is a value that is uniquely set for each UE and that the UE selects between the maximum value and the minimum value. The maximum value of the maximum Tx power 2 may be a value, which is set taking into account overall situations of the UE. The maximum value of the maximum Tx power 2 may be, for example, a sum of maximum Tx powers for power amplifiers, which is set in the UE.

If all power amplifiers in a UE simultaneously use the maximum Tx power, battery consumption of the UE may be severe. To address this issue, the maximum value of the maximum Tx power 2 may be set to a value that is significantly lower than a sum of the maximum Tx powers for the power amplifiers, which is set in the UE. The above value, a part of the UE capability, may be defined as a parameter such as, for example, a Tx power class of a UE, and notified to the eNB in a call setup process or the like. The minimum value of the maximum Tx power 2 is determined by the maximum value that the UE can reduce to maintain the spurious emission caused by multi-carrier UL transmission below specific requirements. The minimum value of the maximum Tx power 2 may be defined as Equation (4) below.

Min Value of Max Tx Power 2=Max Value of Max Tx Power 2−Allowed Power Reduction Value for Satisfying Spurious Emission Requirement by Multi-Carrier UL Transmission (4)

In Equation (4), the allowed power reduction value for satisfying spurious emission requirements by multi-carrier UL transmission is a value that is determined according to which bandwidth in which frequency band the UE uses in performing multi-carrier UL transmission. Like the allowed power reduction values for other spurious emission requirements defined in the 3GPP 36.101 standard, appropriate values for each situation are defined in advance in the standard through simulations.

Figure 6:
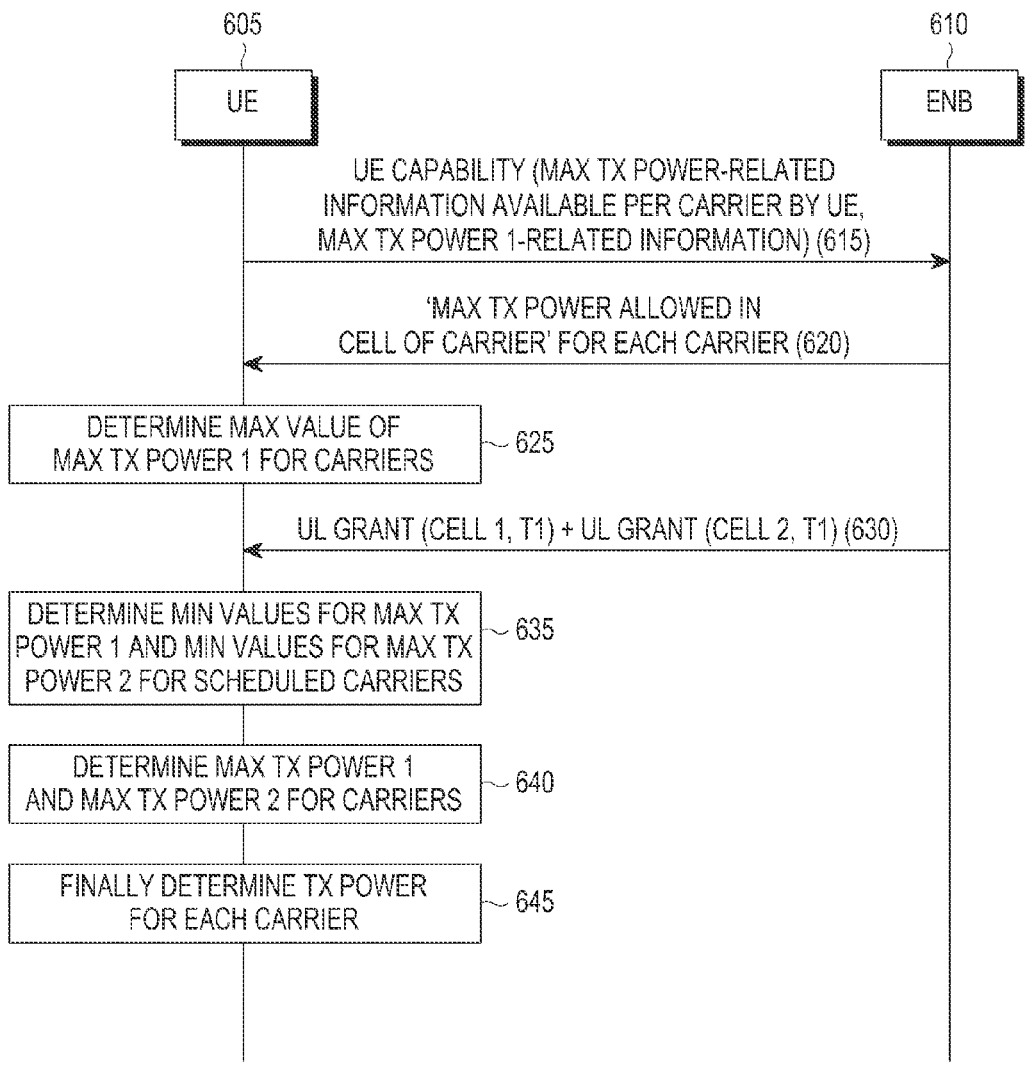
FIG. 6 is a diagram illustrating a signaling flow for determining UL Tx power between a UE and an evolved Node B (eNB) according to the first exemplary embodiment of the present invention.

FIG. 6 illustrates a signaling flow for determining UL Tx power between a UE and an eNB according to the first exemplary embodiment of the present invention.

Referring to FIG. 6, in a mobile communication system having a UE 605 capable of performing UL transmission through multiple UL carriers and an eNB 610 supporting CA technology, the UE 605 transfers maximum Tx power-related information the UE 605 can use for each carrier, and maximum Tx power 2-related information to the eNB 610 using a specific message such as a UE capability report, in step 615. The maximum Tx power-related information available for each carrier is information with which the maximum Tx power available for each carrier can be determined. As described above, the maximum Tx power the UE 605 can use in an arbitrary carrier may be a value that is equal to the maximum Tx power for a power amplifier mapped to the carrier, among a plurality of power amplifiers in the UE 605.

Accordingly, the carrier-specific maximum Tx power that the UE 605 can use may be determined based on the information indicating which power amplifier the UE 605 has, and to which carrier the power amplifier is mapped. Because the power amplifier is connected to one RF device, the maximum Tx power of the UE 605 in an arbitrary carrier may be determined based on the information indicating which carrier an arbitrary RF device supports, and whether the UE 605 has the maximum Tx power for a power amplifier connected to the RF device. The 'maximum Tx power-related information a UE can use for each carrier' that the UE 605 transmits in step 615 may include the following information.

Scheme 1: Carrier information mapped to each power amplifier included in the UE 605. For example, if the UE 605 has a power amplifier A and a power amplifier B, the maximum Tx power for the power amplifier A is A', the maximum Tx power for the power amplifier B is B', the power amplifier A is mapped to carriers a, b and c, and the power amplifier B is mapped to carriers d, e and f, then the UE 605 transfers the following information to the eNB 610.

Power amplifier A: [mapped carriers=a, b, c], maximum Tx power A'

Power amplifier B: [mapped carriers=d, e, f], maximum Tx power B'

If an arbitrary carrier, e.g., the carrier a is scheduled based on the information of Scheme 1, the UE 605 and the eNB 610 use the maximum Tx power A' for the power amplifier A mapped to the carrier a, as the maximum Tx power the UE 605 can use in the carrier a, among the parameters for determining the maximum value of the maximum Tx power 1 for the carrier. If the maximum Tx powers for the power amplifiers A and B are identical, the identical maximum Tx powers are applied as the maximum value of the maximum Tx power 1 for all carriers.

Scheme 2: Carrier information mapped to each RF device included in the UE 605, and maximum Tx power information for the RF device. For example, if the UE 605 has an RF device C and an RF device D, carriers mapped to the RF device C include a, b and c, carriers mapped to the RF device D include d, e and f, the maximum Tx power for the RF device C is A', and the maximum Tx power for the RF device D is B', then the UE 605 transfers the following information to the eNB 610.

RF device C: [mapped carriers=a, b, c], maximum Tx power A'

RF device D: [mapped carriers=d, e, f], maximum Tx power B'

If an arbitrary carrier, e.g., the carrier a, is scheduled based on the information of Scheme 2, the UE 605 and the eNB 610 use the maximum Tx power A' for the RF device C mapped to the carrier a, as the maximum Tx power the UE 605 can use in the carrier a, among the parameters for determining the maximum value of the maximum Tx power 1 for the carrier. If the maximum Tx powers for the RF device C and the RF device D are identical, the identical maximum Tx powers are applied as the maximum value of the maximum Tx power 1 for all carriers.

The maximum Tx power 2-related information is information provided to determine the maximum Tx power 2 of the UE 605, and may be information directly indicating a value of the maximum Tx power 2 of the UE 605, or power class information of the UE 605.

Turning back to FIG. 6, in step 620, the eNB 610 transfers information about 'maximum Tx power allowed in a cell of a carrier' to the UE 605 for each carrier, in aggregating multiple carriers for the UE 605. Although the information about 'maximum Tx power allowed in a cell of a carrier' is a parameter defined uniquely for each cell taking into account inter-cell interference, and is provided to the UE 605 as system information, this information may be transferred to the UE 605 using a specific control message, for extra carriers configured for the UE 605 for CA.

In step 625, the UE 605 determines the maximum value of the maximum Tx power 1 for each carrier configured for the UE 605 based on the received information about 'maximum Tx power allowed in a cell of a carrier'. A process of determining the maximum value of the maximum Tx power 1 is performed on each carrier individually in accordance with Equation (2). For reference, as to the maximum value of the maximum Tx power 2, a separate determining process therefor is not required, since the UE 605 already knows the maximum value of the maximum Tx power 2.

In step 630, the UE 605 receives UL scheduling commands for multiple UL carriers from the eNB 610. For example, the UE 605 receives a UL grant (CELL 1, t1) indicating UL transmission at a time t1, for a cell 1 of a carrier 1, and likewise, receives a UL grant (CELL 2, t1) indicating UL transmission at a time t1, for a cell 2 of a carrier 2.

In step 635, the UE 605 selects an allowed power reduction value for satisfying spurious emission requirements taking into account the scheduling situation for each carrier, and then calculates the minimum value of the maximum Tx power 1 for each carrier based on the allowed power reduction value for satisfying spurious emission requirements in accordance with Equation (3). In addition, the UE 605 determines in how many carriers the UL transmission is scheduled, taking into account the scheduling situation for each carrier, determines an allowed power reduction value for satisfying spurious emission requirements caused by multi-carrier UL transmission, taking into account the frequency band and Tx bandwidth for each UL transmission, and determines the minimum value of the maximum Tx power 2 in accordance with Equation (4).

In step 640, the UE 605 determines the maximum Tx power 1 as an appropriate one of the maximum value of the maximum Tx power 1 and the minimum value of the maximum Tx power 1, and determines the maximum Tx power 2 as an appropriate one of the maximum value of the maximum Tx power 2 and the minimum value of the maximum Tx power 2.

In step 645, the UE 605 determines UL Tx power for each carrier, using the determined maximum Tx power 1 and maximum Tx power 2 for each carrier. The UE 605 calculates required Tx power for each carrier, and determines UL Tx power 1 for each carrier by limiting the required Tx power as the maximum Tx power 1 for the carrier. The UE 605 calculates a sum of UL Tx powers 1 for each carrier, and then compares the sum of the UL Tx powers 1 for each carrier with the maximum Tx power 2. If the sum of the UL Tx powers 1 for each carrier is less than the maximum Tx power 2, the UE 605 finally determines the UL Tx power for each carrier as the UL Tx power 1 for each carrier. If the sum of the UL Tx powers 1 for each carrier exceeds the maximum Tx power 2, the UE 605 finally determines the UL Tx power for each carrier by reducing the UL Tx power for each carrier so that the sum of the UL Tx powers 1 for each carrier may not exceed the maximum Tx power 2.

Figure 7:
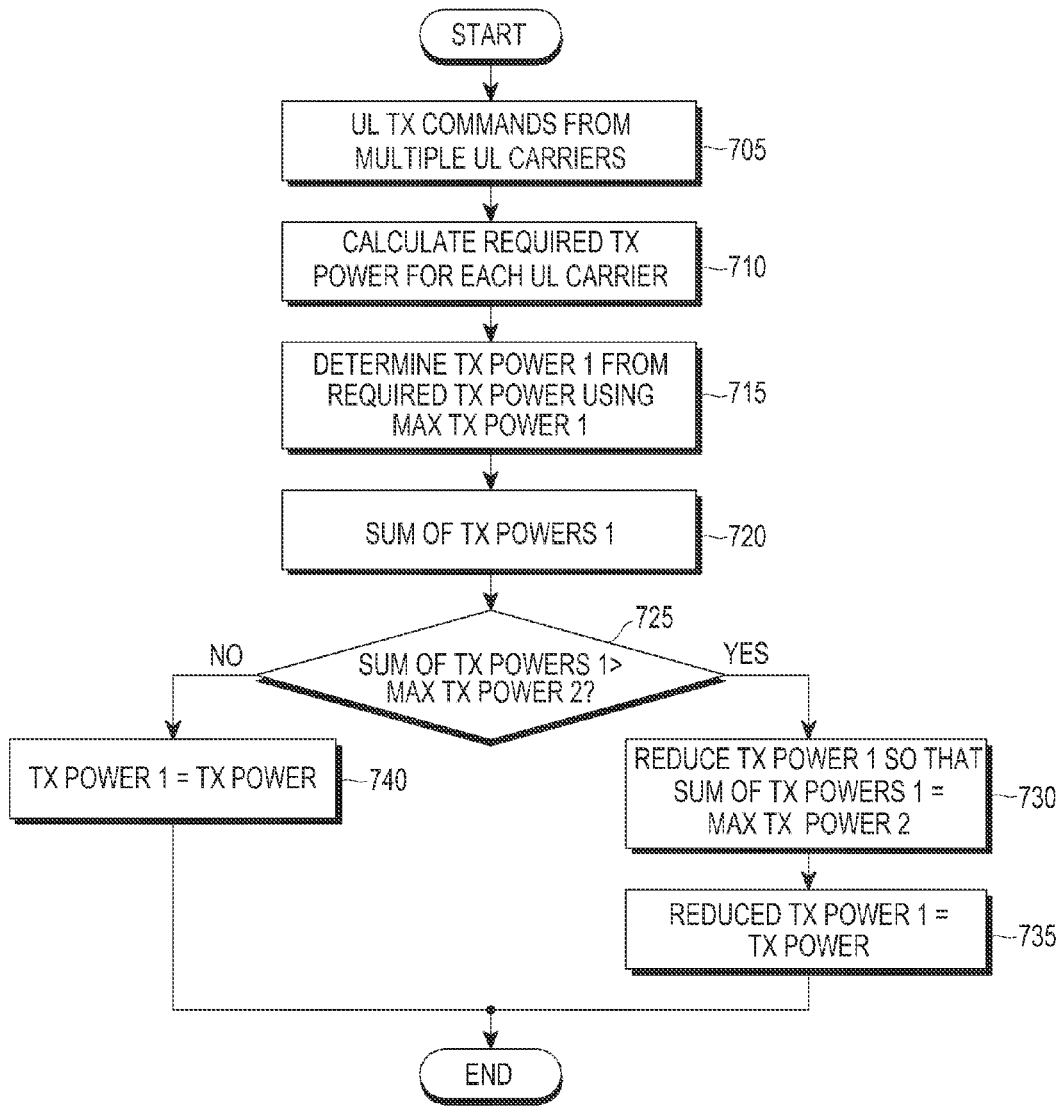
FIG. 7 is a diagram illustrating an operation of determining UL Tx power by a UE according to the first exemplary embodiment of the present invention.

FIG. 7 illustrates an operation of determining UL Tx power by a UE according to the first exemplary embodiment of the present invention.

Upon simultaneously receiving UL Tx commands from multiple UL carriers in step 705, the UE proceeds to step 710 to determine UL Tx power.

In step 710, the UE calculates required Tx power for each UL carrier. In step 715, the UE determines UL Tx power 1 for the carrier to be equal to a smaller one of the maximum Tx power 1 for the carrier and the required Tx power.

The UE sums up the determined UL Tx powers 1 in step 720, and determines in step 725 whether the sum exceeds the maximum Tx power 2. If the sum of the UL Tx powers 1 does not exceed the maximum Tx power 2, the UE finally determines the UL Tx power to be equal to the UL Tx power 1 for each carrier in step 740.

On the other hand, if the sum of the UL Tx powers 1 exceeds the maximum Tx power 2, the UE reduces the UL Tx power 1 for each carrier in a specific manner so that the sum of the UL Tx powers 1 may be equal to the maximum Tx power 2, in step 730. For example, the UE may subtract a value determined by dividing a difference between the sum of the UL Tx powers 1 and the maximum Tx power 2 by the number of the UL Tx powers 1, from the UL Tx powers 1 individually. In step 735, the UE finally determines the UL Tx power for the carrier to be equal to the UL Tx power 1 reduced in the specific manner.

Second Exemplary Embodiment

In multi-carrier UL transmission, if the required Tx power for a carrier exceeds the maximum Tx power 1 for the carrier, the required Tx power for another carrier does not exceed the maximum Tx power 1 for the carrier, and a sum of the UL Tx powers 1 for the carriers exceeds maximum Tx power 2, then the final Tx power for the carrier, the required Tx power of which exceeds the maximum Tx power 1, is first reduced by the maximum Tx power 1, and reduced again by the maximum Tx power 2. This double reduction may excessively reduce the Tx power of UL transmission requiring high Tx power, causing degradation of the entire system capability.

Referring to FIG. 5, while the final UL Tx power 535 for the carrier 1 undergoes power reduction of 50 mW from the required Tx power 510 to 100 mW, the final UL Tx power 540 for the carrier 2 undergoes power reduction of 100 mW from the required Tx power 515 to 150 mW. This is because for the carrier 2, its required Tx power 515 of 250 mW is reduced to the Tx power 1 525 of 200 mW, and then additionally reduced again by 50 mW. This double reduction may be prevented by reducing the Tx power not from the Tx power 1 525 but from the required Tx power 515 when a sum of UL Tx powers for multiple carriers exceeds the maximum Tx power 2 530, as in the second exemplary embodiment of the present invention.

According to the second exemplary embodiment of the present invention, a UE calculates required Tx power for each carrier, sums up the required Tx powers, and then determines if the sum exceeds the maximum Tx power 2. If so, the UE reduces an appropriate amount of Tx power from the required Tx power so that the sum of Tx powers for carriers may be equal to the maximum Tx power 2.

In the example of FIG. 5, a sum (400 mW) of the required Tx power 510 (150 mW) for the carrier 1 and the required Tx power 515 (250 mW) for the carrier 2 exceeds the maximum Tx power 530 (250 mW) by 150 mW. To eliminate the excess Tx power of 150 mW, the UE reduces each of the UL Tx powers for the carriers 1 and 2 by 75 mW. As a result, the UL Tx power 510 for the carrier 1 becomes 75 mW and the UL Tx power 515 for the carrier 2 becomes 175 mW, so both of the two carriers undergo power reduction of the same amount of UL Tx power, making it possible to prevent the power reduction from excessively concentrating on any one carrier.

In reducing the UL Tx power for each carrier individually to maintain the maximum Tx power 2, if the UE reduces the UL Tx power from the required Tx power for each carrier in this way, the UL Tx power for each carrier after undergoing power reduction may still exceed the maximum Tx power 1 for the carrier. The second exemplary embodiment of the present invention will be described below with reference to FIG. 8.

Figure 8:
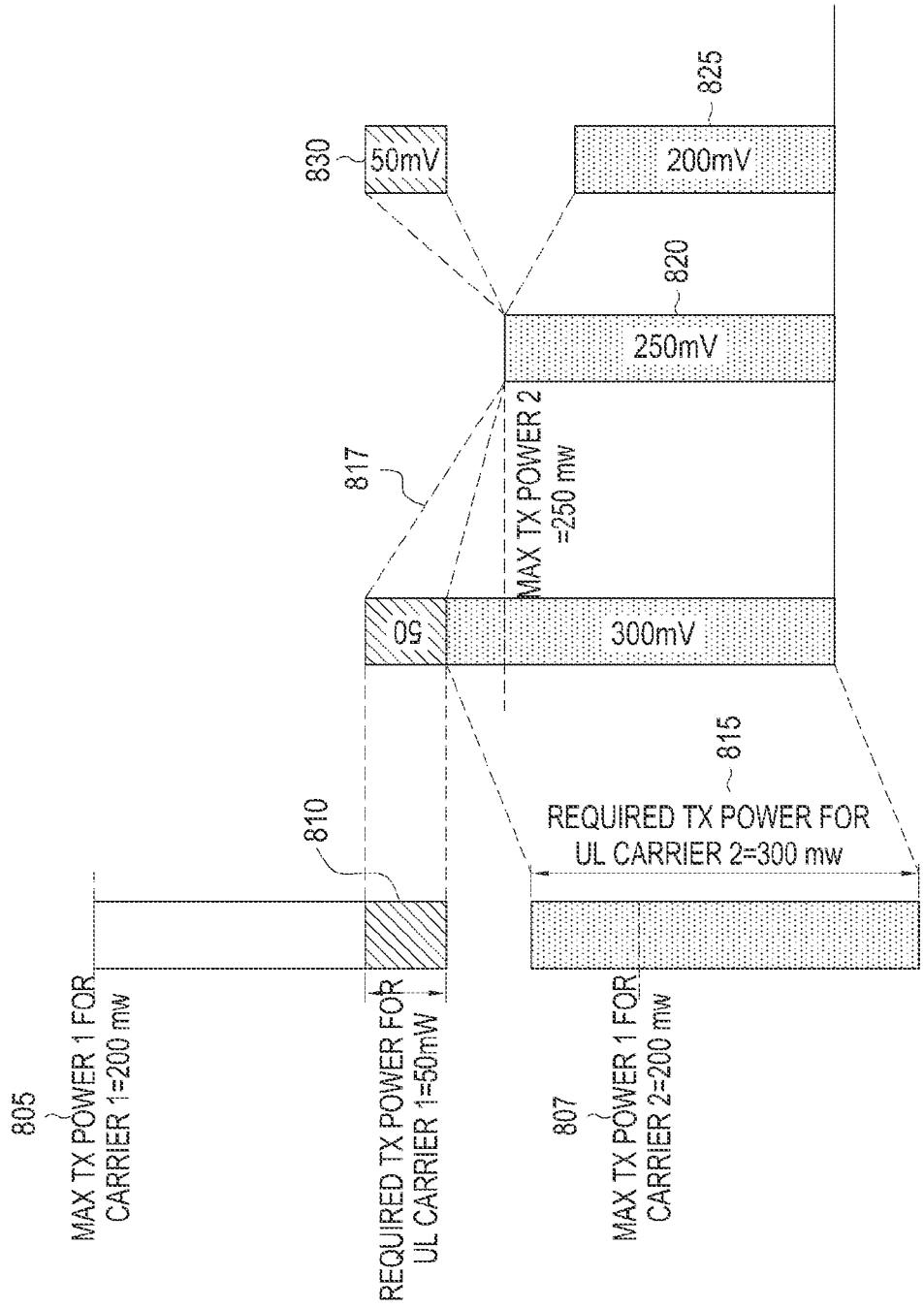
FIG. 8 is a diagram illustrating an example of a method for determining UL Tx power in multi-carrier transmission by a UE according to a second exemplary embodiment of the present invention.

FIG. 8 illustrates a method for determining UL Tx power in multi-carrier transmission by a UE according to a second exemplary embodiment of the present invention.

Referring to FIG. 8, assuming that required Tx power 810 for a carrier 1 is 50 mW and required Tx power 815 for a carrier 2 is 300 mW, since a sum of the required Tx powers 810 and 815 is 350 mW, a UE reduces each of the required Tx powers 810 and 815 for the carriers by 50 mW to match the sum to maximum Tx power 2 817 of 250 mW.

For convenience of description, if UL Tx power, by which each of the required Tx powers 810 and 815 for the carriers is reduced to make a sum of the required Tx powers 810 and 815 be equal to or less than the maximum Tx power 2 817, is referred to as A, a result value determined by reducing A from each of the required Tx powers 810 and 815 may be referred to as Tx power 1'.

Tx power 1' for the carrier 1 is 0 mW, and Tx power 1' 820 for the carrier 2 is 250 mW. Because the Tx power 1' 820 (250 mW) for the carrier 2 exceeds the maximum Tx power 1 807 (200 mW) for the carrier 2 by 50 mW, the UE reduces again the Tx power 1' 820 for carrier 2 by 50 mW to match the final UL Tx power 825 for the carrier 2 to 200 mW. In this process, however, as the UL Tx power for each carrier, which is set such that the sum of all the UL Tx powers may become the maximum Tx power 2 817, is reduced once more, even though the entire UL Tx power should become the final Tx power 2 817 given the sum of required Tx powers, the entire UL Tx power may not become the final Tx power 2 817. To address this issue, the UE may add the Tx power of 50 mW, by which it has secondarily reduced the UL Tx power for the carrier 2, to the final UL Tx power 830 for another carrier having not undergone the secondary power reduction, e.g., the carrier 1, thereby matching the entire UL Tx power to the maximum Tx power 2 817.

Generally, there is only one carrier that undergoes Tx power reduction from the Tx power 1' once again. It is always the same unless the maximum Tx power 2 is set significantly higher than the maximum Tx power 1. In this case, the amount reduced by the second power reduction for the carrier that has undergone double power reduction may be added to the UL Tx power for the carrier that has undergone single power reduction, making it possible to always apply the most efficient UL Tx power.

Figure 9:
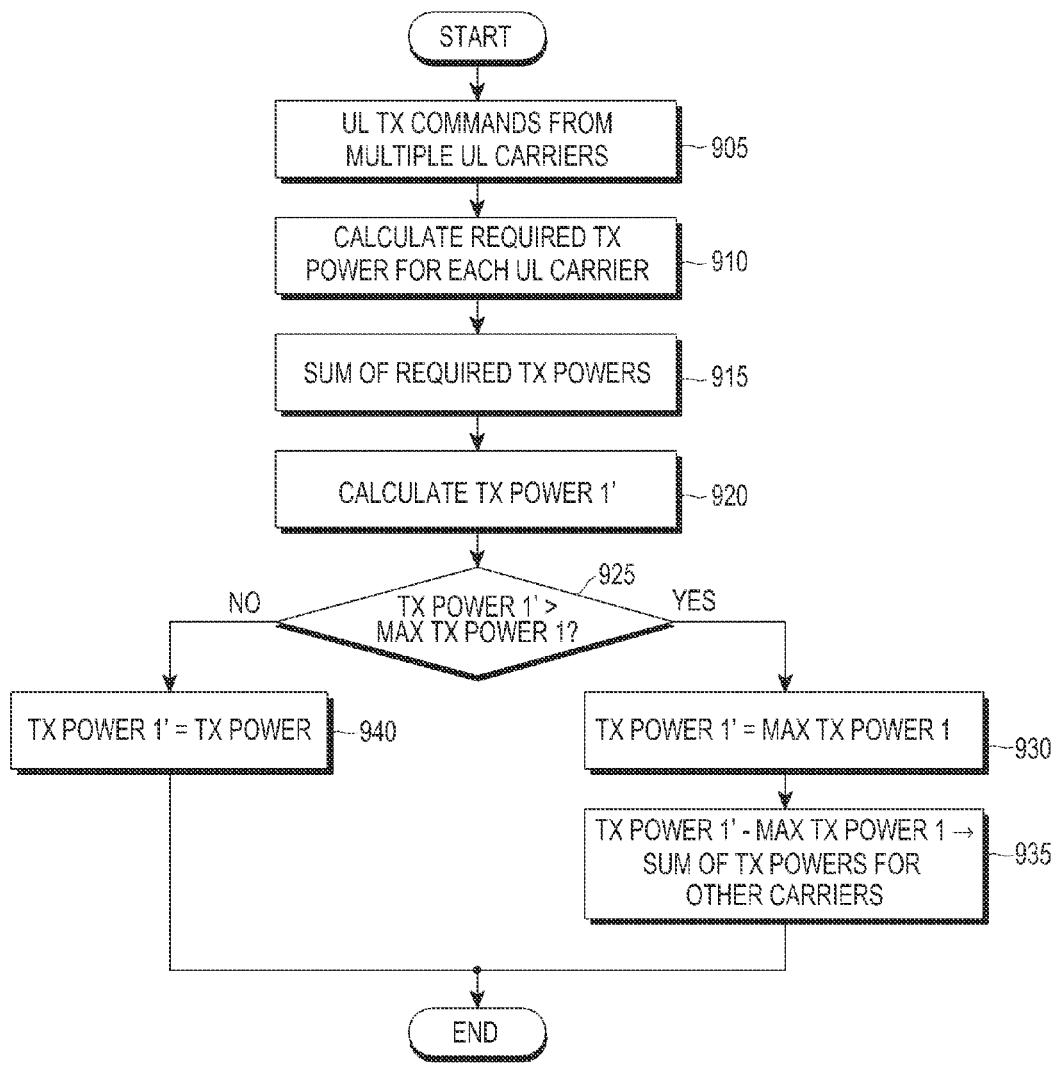
FIG. 9 is a diagram illustrating an operation of determining UL Tx power by a UE according to the second exemplary embodiment of the present invention.

FIG. 9 illustrates an operation of determining UL Tx power by a UE according to the second exemplary embodiment of the present invention.

Upon simultaneously receiving UL Tx commands from multiple UL carriers in step 905, the UE proceeds to step 910 to determine UL Tx power.

The UE calculates required Tx power for each UL carrier in step 910, and sums up the required Tx powers in step 915.

In step 920, the UE calculates Tx power 1' for each carrier. In other words, if the sum of the required Tx powers is less than or equal to the maximum Tx power 2, the UE sets the Tx power 1' for each carrier to be equal to the required Tx power for the carrier. On the other hand, if the sum of the required Tx powers is greater than the maximum Tx power 2, the UE reduces the required Tx powers by the same amount and sets the Tx power 1' for each carrier as the same reduced amount so that the sum of the required Tx powers may be equal to the maximum Tx power 2.

In step 925, the UE compares the Tx power 1' for each carrier with the maximum Tx power 1 for the carrier. If the Tx power 1' is greater than the maximum Tx power 1, the UE proceeds to step 930. Otherwise, the UE proceeds to step 940.

In step 930, the UE determines the UL Tx power for the carrier to be equal to the maximum Tx power 1, and then proceeds to step 935, meaning that the UE has used excessively high Tx power 1' for the carrier. Even though the Tx power corresponding to the amount reduced from the Tx power 1' is used for another carrier, a sum of UL Tx powers does not exceed the maximum Tx power 2. Accordingly, in step 935, the UE adds a value determined by subtracting the maximum Tx power 1 from the Tx power 1', to the UL Tx power for another carrier.

In step 940, the UE selects the Tx power 1' as UL Tx power.

Figure 10:
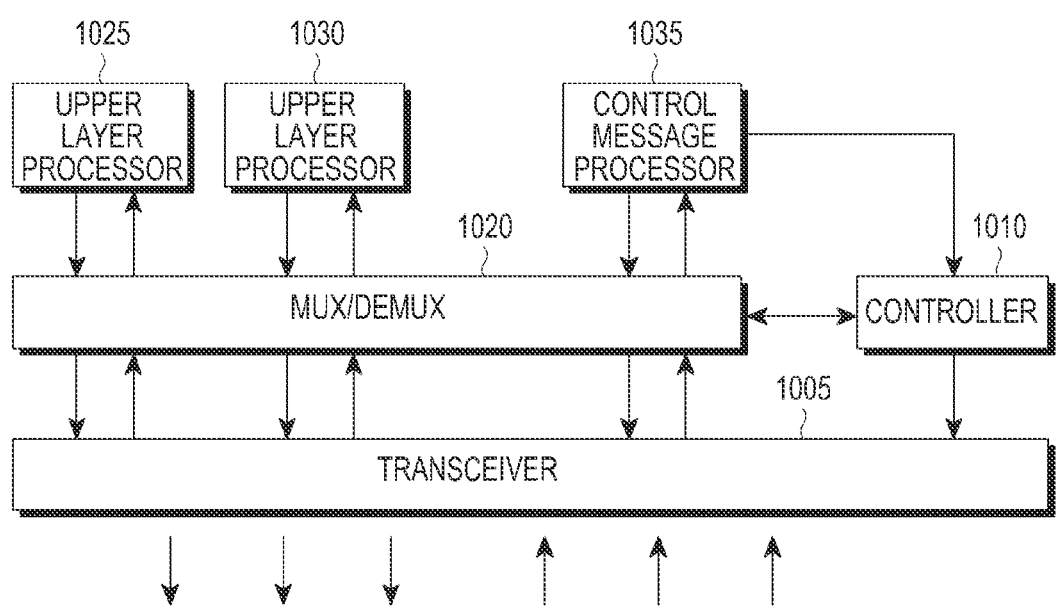
FIG. 10 is a diagram illustrating a structure of a UE according to an exemplary embodiment of the present invention.

FIG. 10 illustrates a structure of a UE according to an exemplary embodiment of the present invention.

Referring to FIG. 10, the UE includes a transceiver 1005, a controller 1010, a MUltipleXer/DEMUltipleXer (MUX/DE-MUX) 1020, a control message processor 1035, and various upper layer processors 1025 and 1030.

The transceiver 1005 receives data and a specific control signal on a DL carrier, and transmits data and a specific control signal on a UL carrier. If multi-carrier transmission/reception is set, the transceiver 1005 performs data transmission/reception and control signal transmission/reception through the multiple carriers.

The MUX/DEMUX 1020 multiplexes data generated by the upper layer processors 1025 and 1030 and/or the control message processor 1035, or demultiplexes data received from the transceiver 1005 and transfers the demultiplexed data to the upper layer processors 1025 and 1030 and/or the control message processor 1035.

The control message processor 1035 performs a necessary operation by processing control messages received from an eNB. The control message processor 1035 transfers information (e.g., information about 'maximum Tx power allowed in a cell of a carrier' for each carrier) for setting UL Tx power for each carrier, which is contained in the control message, to the controller 1010. The control message processor 1035 generates a specific control message containing information such as the maximum value of the maximum Tx power 2, and sends the control message to the eNB.

The upper layer processors 1025 and 1030, which may be constructed for services individually, process data generated in user services such as File Transfer Protocol (FTP) and VoIP and transfer the data to the MUX/DEMUX 1020, or process data received from the MUX/DEMUX 1020 and transfer the data to a service application in an upper layer.

The controller 1010 checks scheduling commands, e.g., UL grants, received through the transceiver 1005, and controls the transceiver 1005 and the MUX/DEMUX 1020 to perform UL transmission with appropriate transmission resources at an appropriate time.

The controller 1010 according to the first exemplary embodiment of the present invention determines the maximum Tx power 1 for each carrier using Equations (1) to (3), in UL transmission, and determines the maximum Tx power 2 for all carriers using the UE capability and Equation (4). The controller 1010 determines the UL Tx power 1 by comparing the required Tx power for each carrier with the determined maximum Tx power 1 as in step 715, and determines the final UL Tx power for each carrier by summing up UL Tx power 1 determined for each carrier, and comparing the sum of the UL Tx powers 1 with the determined maximum Tx power 2 as in steps 720 to 740.

Like in the first exemplary embodiment of the present invention, the controller 1010 according to the second exemplary embodiment of the present invention determines the maximum Tx power 1 for each carrier and the maximum Tx power 2 for all carriers based on the information for Tx power setting. The controller 1010 calculates Tx power 1' by summing up required Tx power for each carrier and comparing the sum with the maximum Tx power 2 as in steps 915 and 920, and determines the final UL Tx power for each carrier by comparing the maximum Tx power 1 with the Tx power 1' as in steps 925 to 940.

The controller 1010 controls the transceiver 1005 to perform UL transmission according to the determined final UL Tx power for each carrier in accordance with the first and second exemplary embodiments of the present invention.

Third Exemplary Embodiment

A third exemplary embodiment of the present invention provides a method, in which using a UE determines Tx power for each carrier the same value as the maximum Tx power 1 and the maximum Tx power 2. The third exemplary embodiment of the present invention defines only one maximum Tx power, instead of separately operating the maximum Tx power 1 (or maximum Tx power for each carrier) and the maximum Tx power 2 (or maximum Tx power for all carriers). To this end, a UE should recognize which Tx power reduction value the UE should apply, for various multi-carrier transmission situations individually. The Tx power reduction value for each situation (e.g., a Tx power reduction value z is applied when a carrier A uses a transmission format x and a carrier B uses a transmission format y, and a Tx power reduction value z' is applied when a carrier B uses a transmission format w and a carrier C uses a transmission format u) is uniquely determined for each UE taking into account the UE capability (e.g., filter capability of a UE). A value determined by subtracting the Tx power reduction value from a specific maximum Tx power value determined from intrinsic maximum Tx powers of power amplifiers in the UE, is defined as a single maximum Tx power value. In the third exemplary embodiment of the present invention, the maximum Tx power value refers to a single maximum Tx power value, which is determined as above and applied to both the Tx power for each carrier and the entire Tx power.

The UE scales the Tx power for each carrier and the entire Tx power based on the single maximum Tx power value. In the third exemplary embodiment of the present invention, the UE first determines the Tx power for each carrier, and may scale the Tx power for each carrier depending on whether a sum of the Tx power for each carrier exceeds the maximum Tx power, or may determine the Tx power for each carrier by comparing a sum of required Tx power for each carrier with the maximum Tx power. A UE operation of first determining the Tx power for each carrier is illustrated in FIG. 11, and a UE operation of first comparing a sum of the required Tx power for each carrier with the maximum Tx power is illustrated in FIG. 12.

Figure 11:
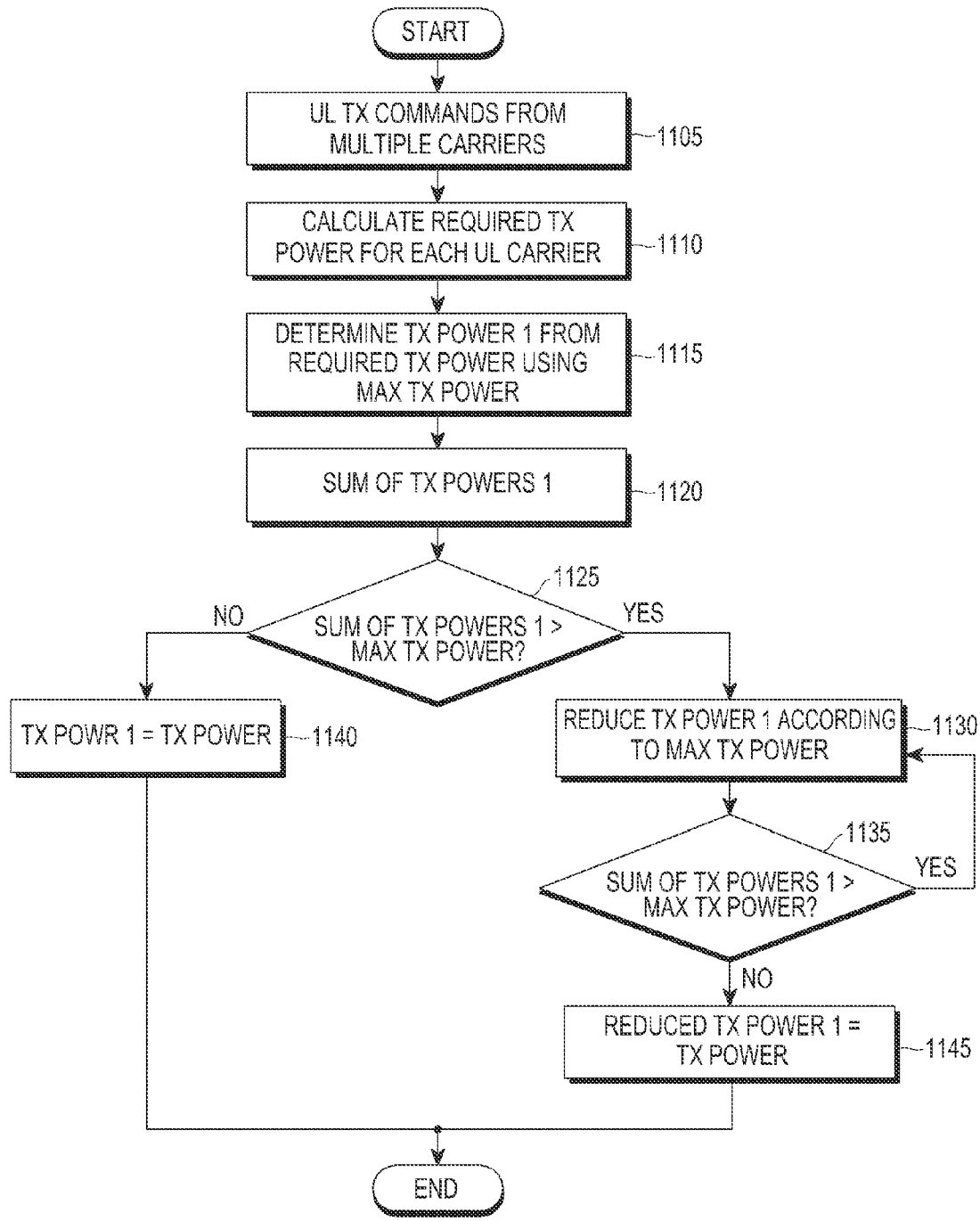
FIG. 11 is a diagram illustrating an example of an operation of determining UL Tx power by a UE according to a third exemplary embodiment of the present invention.
Figure 12:
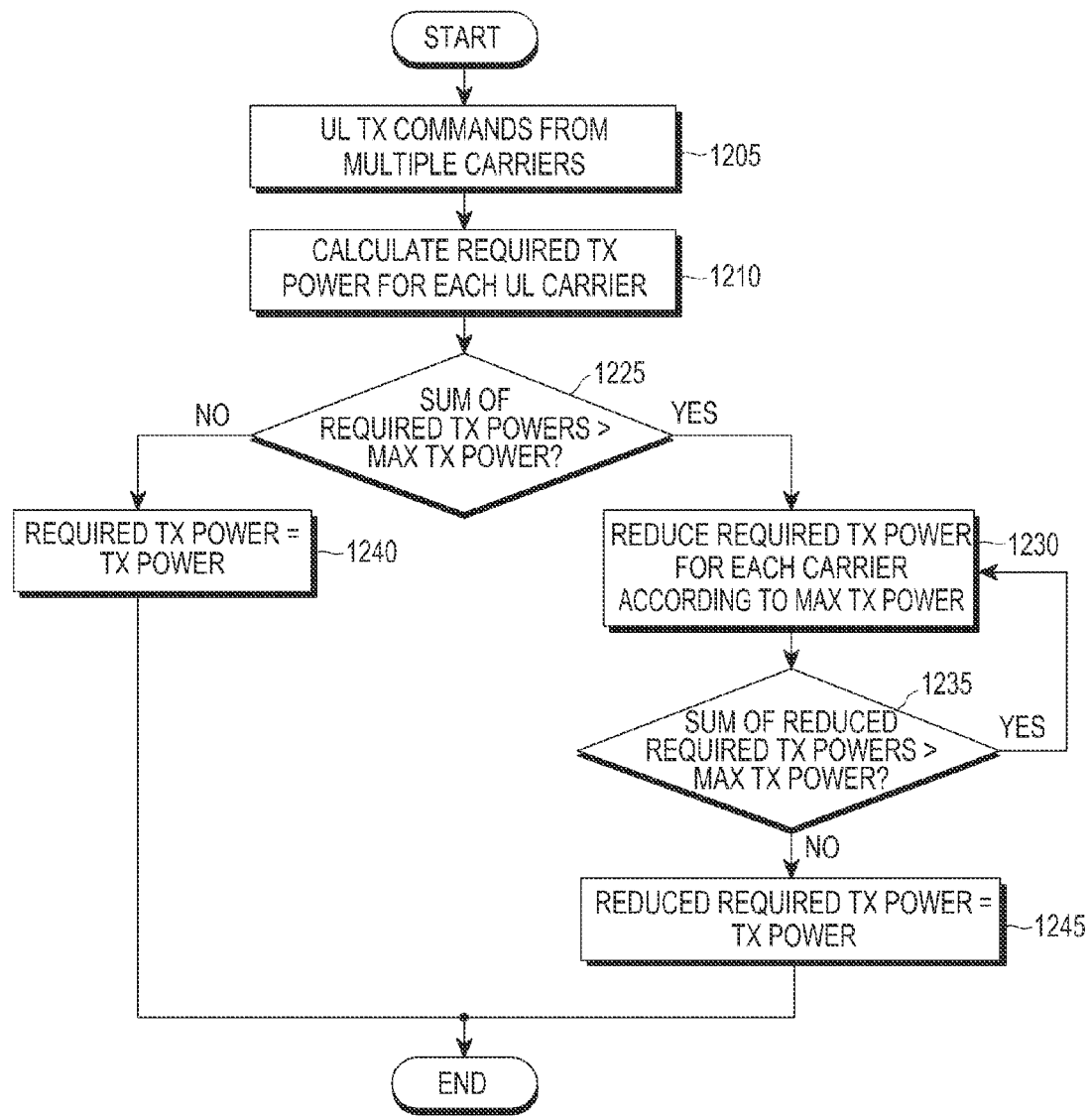
FIG. 12 is a diagram illustrating another example of an operation of determining UL Tx power by a UE according to the third exemplary embodiment of the present invention.

FIG. 11 illustrates an example of an operation of determining UL TX power by a UE according to a third exemplary embodiment of the present invention.

Upon simultaneously receiving UL Tx commands from multiple UL carriers in step 1105, the UE proceeds to step 1110 to determine UL Tx power.

In step 1110, the UE calculates required Tx power for each UL carrier. In step 1115, the UE compares the required Tx power for each carrier with the maximum Tx power, and determines a smaller one of them as UL Tx power 1 for the carrier.

The UE sums up the determined UL Tx power 1 for each carrier in step 1120, and determines in step 1125 whether the sum exceeds the maximum Tx power.

If the sum of UL Tx powers 1 does not exceed the maximum Tx power, the UE sets the UL Tx power for each carrier as the UL Tx power 1 for the carrier in step 1140.

On the other hand, if the sum of UL Tx powers 1 exceeds the maximum Tx power, the UE reduces UL Tx power 1 for each carrier in a specific manner so that the sum of UL Tx powers 1 may be equal to the maximum Tx power, in step 1130. For example, the UE may comprehensively subtract, from the UL Tx power 1, a value (hereinafter referred to as a 'value A') determined by dividing a difference between a sum of UL Tx powers 1 and the maximum Tx power by the number of UL Tx powers 1.

In step 1135, the UE determines whether a sum of the reduced Tx powers 1 exceeds the maximum Tx power. In most cases, as the Tx power is reduced in step 1130, the sum of Tx powers 1 does not exceed the maximum Tx power, but if the UL Tx power 1 for an arbitrary UL carrier is less than A, the entire Tx power still exceeds the maximum Tx power. To prepare for this situation, the UE determines in step 1135 whether the sum of the reduced Tx powers 1 exceeds the maximum Tx power, and if necessary, rescales the reduced Tx powers 1. If the sum of the reduced Tx powers 1 exceeds the maximum Tx power, the UE returns to step 1130 to recalculate a value A (value determined by dividing a difference between the sum of Tx powers 1 and the maximum Tx power by the number of UL carriers with Tx power 1≥0), and to re-reduce the Tx powers 1 by subtracting the value A from the Tx powers 1. The UE repeats the process of determining whether the sum of the re-reduced Tx powers 1 exceeds the maximum Tx power. If the sum of the Tx powers 1 does not exceed the maximum Tx power, the UE determines the reduced maximum Tx power as the final Tx power for each carrier in step 1145, completing the process.

The above process will be described below on the assumption that Tx power 1 for a UL carrier 1 is 90 mW, Tx power 1 for a UL carrier 2 is 80 mW, Tx power 1 for a UL carrier 3 is 10 mW, and the maximum Tx power is 135 mW. A sum of the Tx power 1 for each UL carrier is 180 mW, exceeding the maximum Tx power by 45 mW. The UE calculates A (A=(180−135)/3=15), and subtracts the calculated A from Tx power 1 for each carrier. As a result, the reduced Tx power 1 for the UL carrier 1 is 75 mW, the reduced Tx power 1 for the UL carrier 2 is 65 mW, and the reduced Tx power 1 for the UL carrier 3 is 0 mW. Because 10 mW rather than 15 mW is reduced from the Tx power 1 for the UL carrier 3, the sum of the Tx powers 1 still exceeds the maximum Tx power by 5 mW even after the Tx power reduction.

The sum of the reduced Tx powers is 140 mW, exceeding the maximum Tx power of 135 mW by 5 mW. The UE newly calculates A in this situation, and subtracts the A (=(140−135)/2)=2.5) from the reduced Tx powers for the UL carriers with reduced Tx power ≥0 mW, i.e., for the UL carrier 1 and the UL carrier 2. As a result, the reduced Tx power for the UL carrier 1 is 72.5 mW, the reduced Tx power for the UL carrier 2 is 62.5 mW, and a sum thereof satisfies (equals) the maximum Tx power, so the UE determines the reduced Tx power as the final Tx power for the carriers.

FIG. 12 illustrates another example of an operation of determining UL Tx power by a UE according to the third exemplary embodiment of the present invention.

Referring to FIG. 12, in step 1205, the UE simultaneously receives UL Tx commands from multiple UL carriers. UL Tx commands are received to make UL transmission occur in several UL carriers. The UE calculates required Tx power for each UL carrier in step 1210, and determines in step 1225 whether a sum of the required Tx powers for UL carriers exceeds the maximum Tx power. If the sum does not exceed the maximum Tx power, the UE determines the required Tx power for each UL carrier as Tx power for the carrier in step 1240. On the other hand, if the sum exceeds the maximum Tx power, the UE scales the required Tx power in step 1230. Scaling the required Tx power is achieved by subtracting B from the required Tx power, where B is a value determined by dividing a difference between the sum of the required Tx powers and the maximum Tx power by the number of UL carriers where transmission will occur (or carriers with required Tx power 0). B is equal to A except that required Tx power or reduced required Tx power is used instead of Tx power 1 or recued Tx power 1.

In step 1235, the UE determines whether a sum of the scaled (or reduced) required Tx powers exceeds the maximum Tx power. If the sum does not exceed the maximum Tx power, the UE determines the reduced required Tx power as final Tx power in step 1245. On the other hand, if the sum still exceeds the maximum Tx power, the UE returns to step 1230 to repeat an operation of recalculating B for UL carriers with reduced required Tx power 0, resealing the required Tx power by subtracting the B from the reduced required Tx power, and checking if a sum of the resealed required Tx powers exceeds the maximum Tx power.

In accordance with the third exemplary embodiment of the present invention, the controller 1010 of the UE in FIG. 10 calculates required Tx power for each carrier in UL transmission, and scales Tx power for each carrier by comparing a sum of the required Tx powers with the maximum Tx power based on the flowchart in FIG. 11. Alternatively, the controller 1010 determines Tx power 1 for each carrier in UL transmission, and scales Tx power for each carrier by comparing a sum of the Tx powers 1 with the maximum Tx power based on the flowchart in FIG. 12.

The other components of the UE have been described with reference to FIG. 10, so a detailed description thereof will be omitted.

Fourth Exemplary Embodiment

A fourth exemplary embodiment of the present invention provides a method and apparatus for determining Tx power for each carrier using only one Tx power reduction value.

Figure 13:
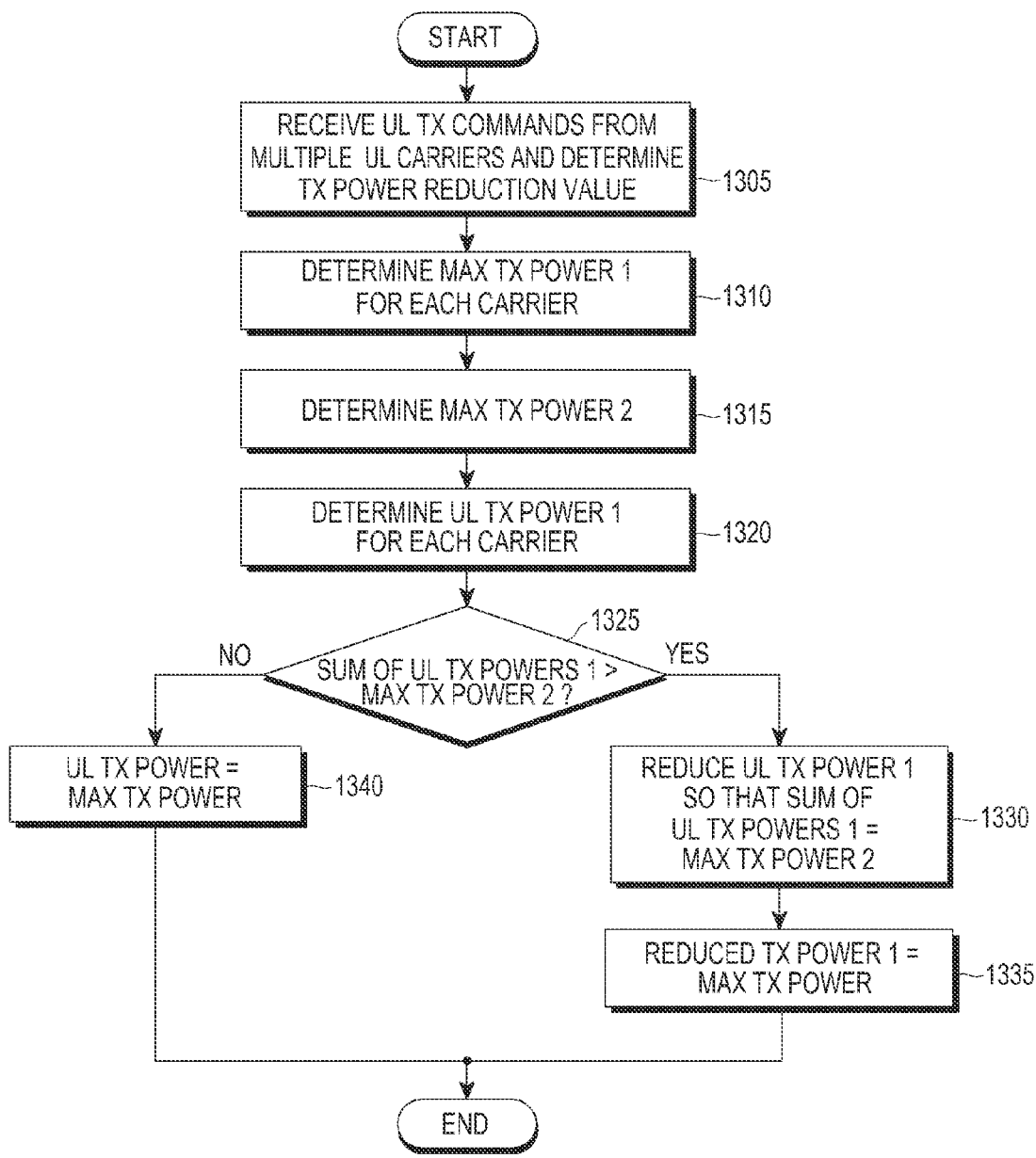
FIG. 13 is a diagram illustrating an example of an operation of determining UL Tx power by a UE according to a fourth exemplary embodiment of the present invention.

FIG. 13 illustrates an example of an operation of determining UL Tx power by a UE according to a fourth exemplary embodiment of the present invention.

Referring to FIG. 13, in step 1305, the UE determines a Tx power reduction value upon simultaneously receiving UL Tx commands from multiple UL carriers. The term 'Tx power reduction value' as used herein may refer to a sum of MPR, A-MPR, ΔTc, etc. defined in the 3GPP 36.101 standard. In multi-carrier UL transmission, the UE determines the Tx power reduction value based on information such as a bandwidth and a frequency band of the carrier where UL transmission will be performed, and information such as a modulation scheme and the number and positions of transmission resource blocks, which will be used in UL transmission. The determined Tx power reduction value is used in common in the subsequent processes of determining maximum Tx power 1 for each carrier and determining the maximum Tx power 2.

In step 1310, the UE calculates maximum Tx power 1 for each UL carrier. The UE performs the following operation for each UL carrier where UL transmission will be performed.

1. The UE determines a maximum value of the maximum Tx power 1. The maximum value of the maximum Tx power 1 is the smaller of a parameter Ppowerclass related to an intrinsic maximum Tx power value of a UE and an allowed Tx power value P-max allowed in an UL carrier (or cell) where UL transmission will be performed. The P-max is the maximum Tx power allowed for each cell individually, and provided as system information of the cell. A normal UE may recognize the parameter P-max by receiving system information of the cell. For a UE performing a multi-carrier operation, an eNB transfers P-max for the UL carrier to the UE using a Radio Resource Control (RRC) control message called a RRC connection reconfiguration message in the process of configuring new UL carriers for the UE.

2. The UE determines a minimum value of the maximum Tx power 1. The minimum value of the maximum Tx power 1 is derived from a value determined by subtracting the Tx power reduction value determined in step 1305 from the maximum value of the maximum Tx power 1.

3. The UE determines an appropriate maximum Tx power 1 between the determined maximum and minimum values of the maximum Tx power 1.

After determining the maximum Tx powers 1 for all UL carriers where UL transmission will be performed, the UE proceeds to step 1315.

In step 1315, the UE determines maximum Tx power 2 using one of the following methods.

Method 1 for Determining Maximum TX Power 2

The UE determines minimum values of P-max and Ppowerclass as a maximum value of the maximum Tx power 2. The P-max is the largest value among P-max values for UL carriers configured in a UE, the largest value among P-max values for UL carriers where UL transmission will be performed, or a value that an eNB has notified in advance. Alternatively, the UE determines Ppowerclass as the maximum value of the maxim Tx power 2. The UE determines a minimum value of the maximum Tx power 2. The minimum value of the maximum Tx power 2 is derived from a value determined by subtracting the Tx power reduction value determined in step 1305 from the maximum value of the maximum Tx power 2. The UE selects maximum Tx power 2 between the maximum and minimum values of the maximum Tx power 2 so that the entire Tx power of the UE may match spurious emission below specific requirements.

Method 2 for Determining Maximum TX Power 2

The UE determines the highest value among the maximum values of the maximum Tx power 1 for the UL carrier where UL transmission will be performed, as a maximum value of the maximum Tx power 2. The UE determines a minimum value of the maximum Tx power 2. The minimum value of the maximum Tx power 2 is derived from a value determined by subtracting the Tx power reduction value determined in step 1305 from the maximum value of the maximum Tx power 2. The UE selects maximum Tx power 2 between the maximum and minimum values of the maximum Tx power 2 so that the entire Tx power of the UE may match spurious emission below specific requirements.

Method 3 for Determining Maximum TX Power 2

The UE determines the highest value among the maximum Tx powers 1 for the UL carriers where UL transmission will be performed, as a maximum value of the maximum Tx power 2.

The maximum Tx power 2 is a parameter whose attributes are different from those of the maximum Tx power 1. These three methods provided to determine maximum Tx power 2 have been designed to determine the maximum Tx power 2, by recycling the method for determining maximum Tx power 1 if possible, instead of designing a new method for determining the maximum Tx power 2.

In step 1320, the UE determines UL Tx power 1 for each UL carrier. The UE calculates required Tx power 1 for each UL carrier, and determines a smaller one of the required Tx power 1 and the maximum Tx power 1 as UL Tx power 1 for the UL carrier.

In step 1325, the UE compares a sum of the UL Tx powers 1 with the maximum Tx power 2. If the sum of the UL Tx powers 1 does not exceed the maximum Tx power 2, the UE determines UL Tx power 1 for the UL carrier as final Tx power for the carrier in step 1340. On the other hand, if the sum of the UL Tx powers 1 exceeds the maximum Tx power 2, the UE reduces the UL Tx power 1 so that the sum of UL Tx powers 1 may be equal to the maximum Tx power 2, in step 1330. The UE determines the reduced Tx power 1 as final Tx power in step 1335.

In accordance with the fourth exemplary embodiment of the present invention, the controller 1010 of the UE determines Tx power 1 for each UL carrier in UL transmission, and scales Tx power for each UL carrier by comparing a sum of the Tx powers 1 with the maximum Tx power 2. To determine the maximum Tx power 2, the controller 1010 determines a maximum value of the maximum Tx power 2 and a minimum value of the maximum Tx power 2, and the maximum value of the maximum Tx power 2 is determined using one of the above-described methods for determining the maximum Tx power 2. The minimum value of the maximum Tx power 2 is derived from a value determined by subtracting the Tx power reduction value from the maximum value of the maximum Tx power 2.

The other components of the UE have been described with reference to FIG. 10, so a detailed description thereof will be omitted.

As is apparent from the foregoing description, in performing multi-carrier UL transmission in the mobile communication system according to exemplary embodiments of the present invention, a UE may efficiently determine UL Tx power to minimize interference to other frequency bands or other cells while maintaining required Tx power if possible. Various other effects will be apparent from the foregoing explicit or implicit description of exemplary embodiments of the present invention.

For example, the first and second exemplary embodiments of the present invention may be realized as follows.

In the first and second exemplary embodiments of the present invention, if a sum of Tx powers for carriers exceeds the maximum Tx power 2, the UE reduces the same amount of Tx power for the carriers individually. For example, in the first exemplary embodiment, if a sum of Tx powers 1 exceeds the maximum Tx power 2, the UE reduces the same amount of Tx power from the Tx powers 1. In the second exemplary embodiment, if a sum of required Tx powers exceeds the maximum Tx power 2, the UE reduces the same amount of Tx power from the required Tx powers. The UE may reduce the same ratio of Tx power, instead of reducing the same amount of Tx power. For example, in the first exemplary embodiment, if the sum of Tx powers 1 exceeds the maximum Tx power 2 by x %, the UE may reduce Tx power 1 for each carrier by x % to match the sum of Tx powers 1 to the Tx power 2. In the second exemplary embodiment, if the sum of required Tx powers exceeds the maximum Tx power 2 by y %, the UE may reduce required Tx power for each carrier by y % and determine the reduced required Tx power as Tx power 1'.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting uplink data using multiple carriers by a User Equipment (UE) in a mobile communication system, the method comprising:

receiving information for setting transmission power from an evolved Node B (eNB);

determining first maximum transmission powers for the multiple carriers, each first maximum transmission power indicating a maximum transmission power for a respective carrier of the multiple carriers, and a second maximum transmission power indicating a maximum total transmission power for all of the multiple carriers based on the information for setting transmission power;

determining an uplink transmission power for each respective carrier of the multiple carriers by selecting a minimum value for the carrier, the minimum value being selected from among a required transmission power for the carrier and the first maximum transmission power for the carrier;

scaling at least one of the determined uplink transmission powers; and transmitting the uplink data based on the scaled at least one of the determined uplink transmission powers, wherein a sum of the scaled at least one of the determined uplink transmission powers of all the multiple carriers is less than or equal to the second maximum transmission power, and wherein the determining of the first maximum transmission powers for each of the respective carriers comprises:

determining a maximum value of the first maximum transmission power for the carrier and a minimum value of the first maximum transmission power for the carrier based on the information for setting transmission power; and determining the first maximum transmission power for the carrier such that the value of the first maximum transmission power for the carrier is less than or equal to the maximum value of the first maximum transmission power for the carrier and greater than or equal to the minimum value of the first maximum transmission power for the carrier.

2. The method of claim 1, wherein the maximum value of the first maximum transmission power for the carrier is determined as a minimum value from among a maximum transmission power allowed in the carrier and a maximum transmission power available in the carrier by the UE.

3. The method of claim 1, wherein the minimum value of the first maximum transmission power for the carrier is determined as a minimum value from among a difference between a maximum transmission power allowed in the carrier and an allowed power reduction value for satisfying spurious emission requirements, and a difference between a maximum transmission power available in the carrier by the UE and the allowed power reduction value for satisfying spurious emission requirements.

4. The method of claim 1, wherein the determining of the second maximum transmission power comprises:
   determining a maximum value of the second maximum transmission power based on a capability of the UE;
   determining a minimum value of the second maximum transmission power based on an allowed power reduction value for satisfying spurious emission requirements; and
   determining the second maximum transmission power whose value is less than or equal to the maximum value of the second maximum transmission power and greater than or equal to the minimum value of the second maximum transmission power.

5. The method of claim 4, wherein the maximum value of the second maximum transmission power is determined from a parameter Ppowerclass related to a maximum transmission power value of the UE and maximum transmission powers for carriers configured in the UE.

6. The method of claim 4, wherein the minimum value of the second maximum transmission power is determined from the maximum value of the second maximum transmission power of the UE and an allowed power reduction value for satisfying spurious emission requirements.

7. The method of claim 3, wherein the allowed power reduction value for satisfying spurious emission requirements includes at least one of an amount of allocated transmission resources, a modulation scheme, and a frequency band of allocated transmission resources.

8. The method of claim 4, wherein the allowed power reduction value for satisfying spurious emission requirements includes at least one of an amount of allocated transmission resources, a modulation scheme, and a frequency band of allocated transmission resources.

9. The method of claim 6, wherein the allowed power reduction value for satisfying spurious emission requirements includes at least one of an amount of allocated transmission resources, a modulation scheme, and a frequency band of allocated transmission resources.

10. The method of claim 1, wherein the second maximum transmission power is a maximum transmission power for the UE.

11. An apparatus for transmitting uplink data using multiple carriers by a User Equipment (UE) in a mobile communication system, the apparatus comprising:
    a receiver for receiving information for setting transmission power from an evolved Node B (eNB);
    a controller for determining first maximum transmission powers for the multiple carriers, each first maximum transmission power indicating a maximum transmission power for a respective carrier of the multiple carriers, and a second maximum transmission power indicating a maximum total transmission power for all of the multiple carriers based on the information for setting transmission power, for determining an uplink transmission power for each respective carrier of the multiple carriers by selecting a minimum value for the carrier, the minimum value being selected from among a required transmission power for the carrier and the first maximum transmission power for the carrier, and for, if a sum of the determined uplink transmission powers is greater than the second maximum transmission power, scaling at least one of the determined uplink transmission powers; and
    a transmitter for transmitting the uplink data based on the scaled at least one of the determined uplink transmission powers,
    wherein a sum of the scaled at least one of the determined uplink transmission powers of all the multiple carriers is less than or equal to the second maximum transmission power, and
    wherein, for each of the respective carriers, the controller:
    determines a maximum value of the first maximum transmission power for the carrier and a minimum value of the first maximum transmission power for the carrier based on the information for setting transmission power; and
    determines the first maximum transmission power for the carrier whose value is less than or equal to the maximum value of the first maximum transmission power for the carrier and greater than or equal to the minimum value of the first maximum transmission power for the carrier.

12. The apparatus of claim 11, wherein the maximum value of the first maximum transmission power for the carrier is determined as a minimum value from among a maximum transmission power allowed in the carrier and a maximum transmission power available in the carrier by the UE.

13. The apparatus of claim 11, wherein the minimum value of the first maximum transmission power for the carrier is determined as a minimum value from among a difference between a maximum transmission power allowed in the carrier and an allowed power reduction value for satisfying spurious emission requirements, and a difference between a maximum transmission power available in the carrier by the UE and the allowed power reduction value for satisfying spurious emission requirements.

14. The apparatus of claim 11, wherein the controller:
    determines a maximum value of the second maximum transmission power based on a capability of the UE;
    determines a minimum value of the second maximum transmission power based on an allowed power reduction value for satisfying spurious emission requirements; and
    determines the second maximum transmission power such that the value of the second maximum transmission power is less than or equal to the maximum value of the second maximum transmission power and greater than or equal to the minimum value of the second maximum transmission power.

15. The apparatus of claim 14, wherein the maximum value of the second maximum transmission power is determined from a parameter Ppowerclass related to a maximum transmission power value of the UE and maximum transmission powers for carriers configured in the UE.

16. The apparatus of claim 14, wherein the minimum value of the second maximum transmission power is determined from a maximum value of the second maximum transmission power of the UE and an allowed power reduction value for satisfying spurious emission requirements.

17. The apparatus of claim 13, wherein the allowed power reduction value for satisfying spurious emission requirements includes at least one of an amount of allocated transmission resources, a modulation scheme, and a frequency band of allocated transmission resources.

18. The apparatus of claim 14, wherein the allowed power reduction value for satisfying spurious emission requirements includes at least one of an amount of allocated transmission resources, a modulation scheme, and a frequency band of allocated transmission resources.

19. The apparatus of claim 16, wherein the allowed power reduction value for satisfying spurious emission requirements includes at least one of an amount of allocated transmission resources, a modulation scheme, and a frequency band of allocated transmission resources.

20. The apparatus of claim 11, wherein the second maximum transmission power is a maximum transmission power for the UE.

21. A method for receiving uplink data transmitted using multiple carriers from a User Equipment (UE) by an evolved Node B (eNB) in a mobile communication system, the method comprising:

transmitting information, for setting transmission power for the uplink data, to the UE; and receiving, from the UE, uplink data that is transmitted with uplink transmission powers scaled based on the information for setting transmission power, wherein for the scaled uplink transmission powers, a first maximum transmission power is determined for each respective carrier of the multiple carriers, each first maximum transmission power indicating a maximum transmission power for the carrier, a second maximum transmission power is determined indicating a maximum total transmission power for all carriers of the multiple carriers based on the information for setting transmission power, an uplink transmission power is determined for each respective carrier of the multiple carriers by selecting a minimum value for the carrier, the minimum value being selected from among a required transmission power for the carrier and the first maximum transmission power for the carrier, and, if a sum of the determined uplink transmission powers is greater than the second maximum transmission power, at least one of the determined uplink transmission powers are scaled, and wherein the scaled at least one of the determined uplink transmission powers of all the multiple carriers is less than or equal to the second maximum transmission power, and wherein for the first maximum transmission power for each of the respective carriers, a maximum value of the first maximum transmission power for the carrier and a minimum value of the first maximum transmission power for the carrier are determined by the UE based on the information for setting transmission power, and wherein the first maximum transmission power for the carrier is determined to have a value which is less than or equal to the maximum value of the first maximum transmission power for the carrier and greater than or equal to the minimum value of the first maximum transmission power for the carrier.

22. The method of claim 21, wherein the maximum value of the first maximum transmission power for the carrier is determined as a minimum value from among a maximum transmission power allowed in the carrier and a maximum transmission power available in the carrier by the UE.

23. The method of claim 21, wherein the minimum value of the first maximum transmission power for the carrier is determined as a minimum value from among a difference between a maximum transmission power allowed in the carrier and an allowed power reduction value for satisfying spurious emission requirements, and a difference between a maximum transmission power available in the carrier by the UE and the allowed power reduction value for satisfying spurious emission requirements.

24. The method of claim 21, wherein for the second maximum transmission power, a maximum value of the second maximum transmission power is determined by the UE based on a capability of the UE, a minimum value of the second maximum transmission power is determined based on an allowed power reduction value for satisfying spurious emission requirements, and the second maximum transmission power is determined to have a value which is less than or equal to the maximum value of the second maximum transmission power and greater than or equal to the minimum value of the second maximum transmission power.

25. The method of claim 24, wherein the maximum value of the second maximum transmission power is determined from a parameter Ppowerclass related to a maximum transmission power value of the UE and maximum transmission powers for carriers configured in the UE.

26. The method of claim 24, wherein the minimum value of the second maximum transmission power is determined from a maximum value of the second maximum transmission power of the UE and the allowed power reduction value for satisfying spurious emission requirements.

27. The method of claim 23, wherein the allowed power reduction value for satisfying spurious emission requirements includes at least one of an amount of allocated transmission resources, a modulation scheme, and a frequency band of allocated transmission resources.

28. The method of claim 24, wherein the allowed power reduction value for satisfying spurious emission requirements includes at least one of an amount of allocated transmission resources, a modulation scheme, and a frequency band of allocated transmission resources.

29. The method of claim 26, wherein the allowed power reduction value for satisfying spurious emission requirements includes at least one of an amount of allocated transmission resources, a modulation scheme, and a frequency band of allocated transmission resources.

30. The method of claim 21, wherein the second maximum transmission power is a maximum transmission power for the UE.

31. An apparatus for receiving uplink data transmitted using multiple carriers from a User Equipment (UE) by an evolved Node B (eNB) in a mobile communication system, the apparatus comprising:

a transmitter for transmitting information, for setting transmission power for the uplink data, to the UE; and a receiver for receiving, from the UE, uplink data that is transmitted with uplink transmission powers scaled based on the information for setting transmission power, wherein for the scaled uplink transmission powers, first maximum transmission powers for the multiple carriers, each first maximum transmission power indicating a maximum transmission power for a respective carrier of the multiple carriers, and a second maximum transmission power indicating a maximum total transmission power for all carriers of the multiple carriers, are determined based on the information for setting transmission power, an uplink transmission power is determined for each respective carrier of the multiple carriers by selecting a minimum value for the carrier, the minimum value being selected from among a required transmission power for the carrier and the first maximum transmission power for the carrier, and, if a sum of the determined uplink transmission powers is greater than the second maximum transmission power, at least one of the determined uplink transmission powers are scaled, and wherein the scaled at least one of the determined uplink transmission powers of all the multiple carriers is less than or equal to the second maximum transmission power, and wherein for the first maximum transmission power for each of the respective carriers, a maximum value of the first maximum transmission power for the carrier and a minimum value of the first maximum transmission power for the carrier are determined by the UE based on the information for setting transmission power, and wherein the first maximum transmission power for the carrier is determined to have a value which is less than or equal to the maximum value of the first maximum transmission power for the carrier and greater than or equal to the minimum value of the first maximum transmission power for the carrier.

32. The apparatus of claim 31, wherein the maximum value of the first maximum transmission power for the carrier is determined as a minimum value from among a maximum transmission power allowed in the carrier and a maximum transmission power available in the carrier by the UE.

33. The apparatus of claim 31, wherein the minimum value of the first maximum transmission power for the carrier is determined as a minimum value from among a difference between a maximum transmission power allowed in the carrier and an allowed power reduction value for satisfying spurious emission requirements, and a difference between a maximum transmission power available in the carrier by the UE and the allowed power reduction value for satisfying spurious emission requirements.

34. The apparatus of claim 31, wherein for the second maximum transmission power, a maximum value of the second maximum transmission power is determined by the UE based on a capability of the UE, a minimum value of the second maximum transmission power is determined based on an allowed power reduction value for satisfying spurious emission requirements, and the second maximum transmission power is determined to have a value which is less than or equal to the maximum value of the second maximum transmission power and greater than or equal to the minimum value of the second maximum transmission power.

35. The apparatus of claim 34, wherein the maximum value of the second maximum transmission power is determined from a parameter Ppowerclass related to a maximum transmission power value of the UE and maximum transmission powers for carriers configured in the UE.

36. The apparatus of claim 34, wherein the minimum value of the second maximum transmission power is determined from a maximum value of the second maximum transmission power of the UE and the allowed power reduction value for satisfying spurious emission requirements.

37. The apparatus of claim 33, wherein the allowed power reduction value for satisfying spurious emission requirements includes at least one of an amount of allocated transmission resources, a modulation scheme, and a frequency band of allocated transmission resources.

38. The apparatus of claim 34, wherein the allowed power reduction value for satisfying spurious emission requirements includes at least one of an amount of allocated transmission resources, a modulation scheme, and a frequency band of allocated transmission resources.

39. The apparatus of claim 36, wherein the allowed power reduction value for satisfying spurious emission requirements includes at least one of an amount of allocated transmission resources, a modulation scheme, and a frequency band of allocated transmission resources.

40. The apparatus of claim 31, wherein the second maximum transmission power is a maximum transmission power for the UE.

* * * * *